US006195741B1

(12) United States Patent
Asato

(10) Patent No.: US 6,195,741 B1
(45) Date of Patent: Feb. 27, 2001

(54) DATA PROCESSING DEVICE HAVING A VARIABLE LENGTH CODE PROCESSING MECHANISM

(75) Inventor: Akira Asato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/145,034

(22) Filed: Sep. 1, 1998

(30) Foreign Application Priority Data

Dec. 25, 1997 (JP) .................................... 9-355948

(51) Int. Cl.⁷ ........................................ G06F 9/30
(52) U.S. Cl. ........................ 712/24; 712/234; 712/208
(58) Field of Search .......................... 712/24, 222, 234, 712/208; 341/55

(56) References Cited

U.S. PATENT DOCUMENTS 5,057,837 * 10/1991 Colwell et al. .................... 341/55
5,673,407 * 9/1997 Poland et al. ..................... 712/222
5,890,009 * 3/1999 Luick et al. ....................... 712/24
5,983,336 * 11/1999 Sakhin et al. ..................... 712/24

* cited by examiner

Primary Examiner—Meng-Ai T. An
Assistant Examiner—Jung W. Chang
(74) Attorney, Agent, or Firm—Staas & Halsey LLP

(57) ABSTRACT

A data processing system which is able to execute, decode and encode process variable length code (VLC) data in a finite number of programming steps and thereby reduce the time required to manipulate VLC data. This is accomplished by using buffer registers to store VLC data loaded from memory and VLC data to be stored to memory. Offset registers are used to indicate the size of the blank region within the buffer registers provided. Using these offset registers load and store processing between the memory and buffer registers and shift processing within the buffer registers can easily be accomplished.

28 Claims, 12 Drawing Sheets

INITIAL STATE

EXECUTE sft01,a

EXECUTE ldc

EXECUTE sftlc

INITIAL STATE

EXECUTE sft01,a $n + a < 32$

EXECUTE ldc

NOTHING IS DONE BECAUSE OFFR < 32

EXECUTE sftlc

NOTHING IS DONE BECAUSE OFFR < 32

INITIAL STATE

WHEN 40 BITS OF VLC REMAIN IN BR0 AND BR1, AND 50 BITS ARE SKIPPED.

PROGRAM sft01' 50;
ldc;
sftlc;
BRANCH WHEN FGR = 1;
FOLLOWING INSTRUCTION;
•
•
•

FIG. 8

WHEN 10 BITS OF VLC REMAIN IN BR0 AND BR1,
AND 45 BITS ARE SKIPPED.

```
PROGRAM
45 BITS SKIPPED WHEN ENCODING sft1' 45;
    stc;
    cpc;
    BRANCH WHEN FGR = 1;
    FOLLOWING INSTRUCTIONS;
         •
         •
         •
```

*FIG. 10*

DATA PROCESSING DEVICE HAVING A VARIABLE LENGTH CODE PROCESSING MECHANISM

CROSS-REFERENCE TO RELATED APPLICATIONS

This application is based upon and claims priority of Japanese Patent Application No. 09-355948 filed Dec. 25, 1997, the contents of which are incorporated herein by reference.

BACKGROUND OF THE INVENTION

1. Field of the Invention

The present invention relates to a data processing device which processes variable length code, and, more particularly, the present invention relates to a data processing device that decreases the processing time required to load variable length code from memory and the processing time required to store variable length code to memory.

2. Description of the Related Art

In the field of media processing, when storing large volume data such as image and audio data in a memory device or transmitting such data to another device, data compression is generally employed to make effective use of resources. Various methods of data compression have been proposed and executed, however, in nearly all methods, the compressed data is variable length code (abbreviated "VLC" hereinafter). Huffman code is one such representative method for compressing data resulting in variable length code.

When using custom hardware to conduct processing that compresses media data into VLC data, and restoring VLC data to media data, software has been used to improve the performance of the custom hardware processor.

A problem encountered in using the instruction set of a general processor is that it is not suitable to handle VLC due to the fragmentary length of the VLC. For example, the load/store instruction of general processors normally targets byte unit data that is byte aligned, and therefore, to configure VLC data that extends across a word boundary into a general register, two loads and several shift and logical calculations are required. In addition, because the number of required loads depends on the VLC lead offset and VLC length, a condition determination operation must be executed several times.

In this way, when using the instruction set of a conventional general processor to process VLC load/store operations, many instructions are necessary, and therefore, it is likely that this will create a significant performance overhead.

The present invention has the purpose of addressing the problems encountered in manipulating VLC data, and resolving these problems by offering a variable length code processing mechanism suitable for handling VLC data.

SUMMARY OF THE INVENTION

An object of the present invention is to provide a data processing device which efficiently processes variable length code ("VLC").

Objects and advantages of the present invention are achieved by a data processing device having a variable length code processing mechanism which includes the following elements. An address register is used to store access addresses in a memory. A first buffer register is used to store data loaded from the memory and where the first buffer register has a bit width at least equal to a load data width from the memory. A second buffer register is connected to the first buffer register. The contents of the first buffer register are shifted and stored into the second buffer register. An offset register stores the length of an empty region produced in a linked region which is configured by linking the first buffer register and the second buffer register when the data is packed and stored into an unlinked end of the second buffer register. A first processing unit is used to shift the data which exists in the linked region and which is packed and stored in the unlinked end of the second buffer register, to the unlinked end of the second buffer register by a specified amount. Simultaneously the first processing unit increments the offset register value by the shift amount. A second processing unit loads the data held in memory addressed by the value of the address register, in the first buffer register, and simultaneously increments the value of the address register by a specified amount when the value of the offset register is equal to or greater than the value of a bit width of the first buffer register. However, the second processing unit takes no action when the value of the offset register is less than the bit width of the first buffer register. When the value of the offset register is equal to or greater than the value of the bit width of the first buffer register, a third processing unit shifts the contents of the first buffer register, which the second processing unit has loaded from memory, to the second buffer register by a number of bits equal to the contents of the offset register minus the first buffer register bit width. The third processing unit then substitutes a bit portion of the linked end of the second buffer register, which is equal to the contents of the offset register minus the first buffer register bit width, with the bits shifted out from the first buffer register, and simultaneously decrements the value of the offset register by the number of the buffer register bits. However, the third processing unit takes no action when the value of the offset register is less than the bit width of the first buffer register.

Further objects of the present invention are achieved by a data processing device having a variable length code processing mechanism which includes the following elements. An address register stores access addresses in memory. A first buffer register, having a bit width at least equal to a load data width from the memory, stores data loaded from the memory. A second buffer register is connected to the first buffer register. The contents of the first buffer register are shifted and stored into the second buffer register. An offset register is used to store the length of an empty region produced in a linked region which is configured by linking the first buffer register and the second buffer register when the data is packed and stored into an unlinked end of the second buffer register. A first shift instruction that designates a shift amount as an operand, shifts the data existing in the linked region to the unlinked end of the second buffer register by the shift amount, and simultaneously increments the offset register value by shift amount. A conditional load instruction loads the data held in memory addressed by the value of the address register, in the first buffer register, and simultaneously increments the value of the address register by a specified amount when the value of the offset register is equal to or greater than the value of a bit width of the first buffer register. However, the conditional load instruction takes no action when the value of the offset register is less than the bit width of the first buffer register. When the value of the offset register is equal to or greater than the value of a bit width of the first buffer register, a second shift instruction is used to shift the contents of the first buffer register, which the conditional load instruction has loaded from memory, to the second buffer register by a number of bits equal to the contents of the offset register minus the first buffer register bit width. The second shift instruction then substitutes a bit portion of a linked end of the second buffer register, which is equal to the contents of the offset register minus the first buffer register bit width, with the bits shifted out from the first buffer register, and simultaneously increments the value of the offset register by the number of the buffer register bits. However, the second shift instruction takes no action when the value of the offset register is less than the bit width of the first buffer register.

In accordance with embodiments of the present invention, the data processing device further includes the following elements. A second offset register is used to set a difference between the shift amount specified as the operand of the first shift instruction and the bit width of the first buffer register. A flag register is set when the first shift instruction designates the shift amount that exceeds the bit width of the first buffer register. When the value of the second offset register does not exceed the bit width of the first buffer register, a third shift instruction shifts the linked region of the first and second buffer registers to the unlinked end of the second buffer register by a value of the second offset register. The third shift instruction also simultaneously increments the value of the offset register by the shift amount and sets the second offset register and flag register to 0. However, when the value of the second offset register does exceed the bit width of the first buffer register, the third shift instruction shifts the linked region of the first and second buffer registers to the unlinked end of the second buffer register by the bit width portion of the first buffer register. The third shift instruction simultaneously increments the value of the offset register by the number of bits of the first buffer register and reduces the value of the second offset register by the number of bits of the first buffer register. When the first shift instruction designates a shift amount that exceeds the bit width of the first buffer register and when the value of the flag register is 1 after the LO first shift instruction, the conditional load instruction and second shift instruction are executed, this causes the processing flow to branch into a instruction sequence comprising the third shift instruction, the conditional load instruction and the second shift instruction, and the instruction sequence is repeated until the flag register value becomes 0.

Further objects of the present invention are achieved by a data processing device having the following elements. An address register stores access addresses in memory. A first buffer register has a bit width at least equal to the load data width from the memory, and stores data loaded from the memory. A second buffer register is linked to the first buffer register, and the contents of the first buffer register are shifted and stored into the second buffer register. A first offset register stores the length of an empty region produced in a linked region which is configured by linking the first buffer register and the second buffer register when the data is packed and stored into an unlinked end of the second buffer register. A first shift instruction, that designates a shift amount as an operand, shifts the data existing in the linked region to the unlinked end of the second buffer register by the shift amount, and simultaneously increments the first offset register value by just the shift amount. When the value of the first offset register is equal to or greater than the value of the bit width of the first buffer register, a conditional load instruction loads the data held in memory addressed by the value of the address register, in the first buffer register, and simultaneously increments the value of the address register by a specified amount. However, the conditional load instruction does nothing when the value of the first offset register is less than the bit width of the first buffer register. When the value of the first offset register is is equal to or greater than the value of the bit width of the first buffer register, a second shift instruction shifts the contents of the first buffer register, which the conditional load instruction has loaded from memory, to the second buffer register by a number of bits equal to the contents of the first offset register minus the first buffer register bit width. The second shift instruction substitutes a bit portion of the linked end of the second buffer register, which is equal to the contents of the first offset register minus a first buffer register bit width, with the bits shifted out from the first buffer register. It also simultaneously decrements the value of the first offset register by a number of the buffer register bits. However, the second shift instruction does nothing if the value of the first offset register is less than the bit width of the first buffer register. A second offset register sets the difference between the shift amount specified as the operand of the first shift instruction and the bit width of the first register. A flag register is set when the first shift instruction designates the shift amount that exceeds the bit width of the first register. When the value of the second offset register does not exceed the bit width of the first buffer register, the first shift instruction also includes a function to shift the linked region of the first and second buffer registers to the unlinked end of the second buffer register by a value of the second offset register, and simultaneously increments the value of the first offset register by the shift amount and to set the second offset register and flag register to 0. However, when the value of the second offset register does exceed the bit width of the first buffer register, the function shifts the linked region of the first and second buffer registers to the unlinked end of the second buffer register by the bit width portion of the first buffer register, and simultaneously increments the value of the first offset register by the number of bits of the first buffer register and reduces the value of the second offset register by the number of bits of the first buffer register. When the first shift instruction designates an shift amount that exceeds the bit width of the first buffer register and when the value of the flag register is 1 after the first shift instruction, the conditional load instruction and the second shift instruction are executed, this causes repeated execution of a instruction sequence comprising of the third shift instruction, the conditional load instruction and the second shift instruction, until the flag register value becomes 0.

In accordance with embodiments of the present invention, the address register is no custom register provided and a general register, which can be designated as an operand of the conditional load instruction, is used as the memory access address register.

In accordance with embodiments of the present invention, the first shift instruction has a target operand designation function, and stores in a general purpose register designated as the target the bit string shifted out from the second buffer register when executing the first shift instruction.

In accordance with embodiments of the present invention, the data processing device further includes a circuit to calculate the shift amount by the second buffer register by means of inputting the value of the necessary number of bits of the unlinked end. Thereby, the circuit determines the shift amount without the first shift instruction providing the shift amount as an operand.

In accordance with embodiments of the present invention, the data processing device also includes a means for detecting and notifying the fact that the address register value exceeds a separately stipulated range when the conditional load instruction increments the address register value.

In accordance with embodiments of the present invention, the data processing device also includes the following elements. An address register stores access addresses in memory. A first buffer register has a bit width at least equal to the load data width from the memory, and stores data loaded from the memory. A second buffer register is linked to the first buffer register, and the contents of the first buffer register are shifted and stored into the second buffer register. A first offset register stores the length of an empty region produced in a linked region which is configured by linking the first buffer register, and the second buffer register when the data is packed and stored into an unlinked end of the second buffer register. A first shift instruction, that designates a shift amount as an operand, shifts the data existing in the linked region to the unlinked end of the second buffer register by the shift amount, and simultaneously increments the first offset register value by just the shift amount. When the value of the first offset register is equal to or greater than the value of the bit width of the first buffer register, a conditional load instruction loads the data held in memory addressed by the value of the address register, in the first buffer register, and simultaneously increments the value of the address register by just a specified amount. However, the conditional load instruction does nothing when the value of the first offset register is less than the bit width of the first buffer register.

When the value of the first offset register is equal to or greater than the value of the bit width of the first buffer register, a second shift instruction shifts the contents of the first buffer register, which the conditional load instruction has loaded from memory, to the second buffer register by a number of bits equal to the contents of the first offset register minus the first buffer register bit width. The second shift instruction also substitutes a bit portion of the linked end of the second buffer register, which is equal to the contents of the first offset register minus a first buffer register bit width, with the bits shifted out from the first buffer register, and simultaneously decrements the value of the offset register by a number of the buffer register bits. However, the second shift instruction does nothing if the value of the first offset register is less than the bit width of the first buffer register. A second offset register is used to set the difference between the shift amount specified as the operand of the first shift instruction and the bit width of the first register. A flag register is set when the first shift instruction designates the shift amount that exceeds the bit width of the first register.

When the value of the second offset register does not exceed the bit width of the first buffer register, the first shift instruction also includes a function to shift the linked region of the first and second buffer registers to the unlinked end of the second buffer register by a value of the second offset register. It also simultaneously increments the value of the first offset register by the shift amount and sets the second offset register and flag register to 0. When the value of the second offset register does exceed the bit width of the first buffer register, the function also shifts the linked region of the first and second buffer registers to the unlinked end of the second buffer register by the bit width portion of the first buffer register, and simultaneously increments the value of the offset register by the number of bits of the first buffer register and reduces the value of the second offset register by the number of bits of the first buffer register. When the first shift instruction designates an shift amount that exceeds the bit width of the first buffer register and when the value of the flag register is 1 after the first shift instruction, the conditional load instruction and the second shift instruction are executed, this causes repeated execution of a instruction sequence comprising the third shift instruction, the conditional load instruction and the second shift instruction, until the flag register value becomes 0.

Further objects of the present invention are achieved by a data processing device having the following elements. An address register stores access addresses in memory. A first buffer register has a bit width equal to the width of the data stored in the memory, and stores the data to be stored in the memory. A second buffer register is linked to the first buffer register, and the contents of the second buffer register are shifted and stored to the first buffer register. An offset register stores the length of an empty region produced in a linked region which is configured by linking the first buffer register and the second buffer register when the data is packed and stored into an unlinked end of the first buffer register. A first processing unit is used to set the variable length data in the second buffer register. A second processing unit shifts the contents of the second buffer register to the unlinked end of the first buffer register by a shift amount equal to the contents of the offset register minus the second buffer register bit width, and substitutes a bit portion of the linked end of the first buffer register, which is equal to the contents of the offset register minus the second buffer register bit width, with the bits shifted out from the second buffer register, and simultaneously decreases the offset register value by a code length of the variable length data. A third processing unit stores the data of the first buffer register into memory addressed by the value of the address register, and simultaneously increments the value of the address register by a specified amount when the value of the offset register is equal to or less than the value of the bit width of the second buffer register. However, the third processing unit does nothing when the value of the offset register exceeds the bit width of the second buffer register. A fourth processing unit copies the contents of the second buffer register to the first buffer register, and simultaneously increments the value of the offset register by a number of the second buffer register bit width when the value of the offset register is equal to or less than the value of the bit width of the second buffer register. However, the fourth processing unit does nothing when the value of the offset register does exceed the bit width of the second buffer register.

Further objects of the present invention are achieved by a data processing device having the following elements. An address register stores access addresses in memory. A first buffer register has a bit width equal to the width of the data stored in the memory, and stores the data to be stored in the memory. A second buffer register is linked to the first buffer register, and the contents of the second buffer register are shifted and stored to the first buffer register. An offset register stores the length of an empty region produced in a linked region which is configured by linking the first buffer register and the second buffer register when the data is packed and stored into an unlinked end of the first buffer register. A write instruction is used to set the data given as the operand to the second buffer register. A shift instruction designates a code length as an operand, shifts the contents of the second buffer register to the unlinked side of the first buffer register by a number equal to the contents of the offset register minus the second buffer register bit width, substitutes a bit portion of the linked end of the first buffer register, which is equal to the contents of the offset register minus the second buffer register bit width, with the bits shifted out from the second buffer register, and simultaneously decreases the offset register value by the code length of the operand. A conditional store instruction stores the data of the first buffer register into memory addressed by the value of the address register, and simultaneously increments the value of the address register by a specified amount when the value of the offset register is equal to or less than the value of the bit width of the second buffer register. However, the conditional store instruction does nothing if the value of the offset register exceeds the bit width of the second buffer register. A conditional copy instruction copies the contents of the second buffer register to the first buffer register, and simultaneously increments the value of the offset register by a number of the second buffer register bit width when the value of the offset register is equal to or less than the value of the bit width of the second buffer register. However, the conditional copy instruction does nothing if the value of the offset register does exceed the bit width of the second buffer register.

In accordance with embodiments of the present invention, the data processing device also includes the following elements. A second offset register is used to set the difference between a code length specified as the operand of the shift instruction and the bit width of the second buffer register. A flag register is set when a code length that exceeds the bit width of the second buffer register is designated by the shift instruction. When the value of the second offset register does not exceed the bit width of the second buffer register, a second shift instruction shifts the contents of the second buffer register to the first buffer register by a number of bits of equal to the contents of the offset register minus the second buffer register bit width, and replaces a bit portion of the linked end of the first buffer register, which is equal to the contents of the offset register minus the second buffer register bit width, with the bits shifted out from the second buffer register. It also simultaneously reduces the value of the offset register by the value of the second offset register and also sets the values of the second offset register and flag register to 0. However, the second shift instruction, when the value of the second offset register does exceed the bit width of the second buffer register, shifts the contents of the second buffer register to the first buffer register by a bit number equal to the contents of the offset register minus the second buffer register bit width. It also replaces a bit portion of the linked end of the first buffer register, which is equal to the contents of the offset register minus the second buffer register bit width, with the bits shifted out from the second buffer register, and simultaneously reduces the values of the offset register and second offset register by the number of bits of the second buffer register. When the shift instruction designates a code length that exceeds the bit width of the second buffer register, the shift instruction, the conditional store instruction, and the conditional copy instruction are executed, and when the value of the flag register is 1, this causes the processing flow to branch into a instruction sequence comprising the second shift instruction, the conditional store instruction and the conditional copy instruction, and the instruction sequence is repeated until the flag register value becomes 0.

Still further objects of the present invention are achieved by a data processing device having the following elements. An address register stores access addresses in memory. A first buffer register has a bit width equal to the width of the data stored in the memory, and stores the data to be stored in the memory. A second buffer register is linked to the first buffer register, and the contents of the second buffer register are shifted and stored to the first buffer register. An offset register stores the length of an empty region produced in a linked region which is configured by linking the first buffer register and the second buffer register when the data is packed and stored into an unlinked end of the first buffer register. A write instruction is used to set the data given as the operand to the second buffer register. A shift instruction designates a code length as an operand, shifts the contents of the second buffer register to an unlinked side of the first buffer register by a number of bits equal to the contents of the offset register minus the second buffer register bit width, substitutes a bit portion of the linked end of the first buffer register, which is equal to the contents of the offset register minus the second buffer register bit width, with the bits shifted out from the second buffer register, and simultaneously decreases the offset register value by a code length of the operand. A conditional store instruction stores the data of the first buffer register into memory addressed by the value of the address register, and simultaneously increments the value of the address register by a specified amount when the value of the offset register is equal to or less than the value of the bit width of the second buffer register. However, the conditional store instruction does nothing when the value of the offset register exceeds the bit width of the second buffer register. A conditional copy instruction copies the contents of the second buffer register to the first buffer register, and simultaneously increments the value of the offset register by the number of the second buffer register bit width when the value of the offset register is equal to or less than the value of the bit width of the second buffer register. However, the conditional copy instruction does nothing when the value of the offset register does exceed the bit width of the second buffer register. A second offset register sets the difference between a code length specified as the operand of the shift instruction and the bit width of the second buffer register. A flag register is set when a code length that exceeds the bit width of the second buffer register is designated by the shift instruction.

The shift instruction also, when the value of the second offset register does not exceed the bit width of the second buffer register, shifts the contents of the second buffer register to the first buffer register by a number of bits equal to the contents of the offset register minus the second buffer register bit width. The shift instruction also replaces a bit portion of the linked end of the first buffer register, which is equal to the contents of the offset register minus the second buffer register bit width, with the bits shifted out from the second buffer register, and simultaneously reduces the value of the offset register by the value of the second offset register and also sets the values of the second offset register and flag register to 0.

Also when the value of the second offset register does exceed the bit width of the second buffer register, the shift instruction shifts the contents of the second buffer register to the first buffer register by a bit number equal to the contents of the offset register minus the second buffer register bit width, replaces the bit portion of the linked end of the first buffer register, which is equal to the contents of the offset register minus the second buffer register bit width, with the bits shifted out from the second buffer register, and simultaneously reduces the values of the offset register and second offset register by the number of bits of the second buffer register. When the shift instruction designates a code length that exceeds the bit width of the second buffer register, the shift instruction, the conditional store instruction, and the conditional copy instruction are executed, and then the fact that the value of the flag register is 1 causes the processing flow to branch into a instruction sequence comprising of the shift instruction, the conditional store instruction and the conditional copy instruction, and the instruction sequence is repeated until the flag register value becomes 0.

In accordance with embodiments of the present invention, the write instruction sets the data targeted for processing to the unlinked end of the second buffer register, and takes the shift amount of the shift instruction to be the contents of the offset register minus the length of the data targeted for processing.

In accordance with embodiments of the present invention, the data processing device also has a instruction that combines the conditional store instruction function and the conditional copy instruction function.

In accordance with embodiments of the present invention, the data processing device also has a unit for calculating the shift amount by the second buffer register inputting the value of the necessary number of bits of the unlinked end, and by using a hardware circuit unit for determining the shift amount without the first shift instruction providing the shift amount as an operand.

In accordance with embodiments of the present invention, the data processing device also has a circuit mechanism for detecting and notifying a fact that the address register value exceeds a separately stipulated range when the conditional store instruction increments the address register value.

BRIEF DESCRIPTION OF THE DRAWINGS

These and other objects and advantages of the invention will become apparent and more readily appreciated for the following description of the preferred embodiments, taken in conjunction with the accompanying drawings of which:

FIG. 2A is a diagram showing the initial state of VLC data prior to execution of a sft01 instruction in which n indicates the length of the blank region in BR1, and address indicates the address to be loaded next of the present invention.

FIG. 2B is a diagram showing the state of operations when the sft01 instruction is executed with the provided shift amount a as the operand, and as a result, n+a>=32 in the present invention.

FIG. 2C is a diagram showing the state of operations when the ldc instruction is executed and the new data is loaded in BR1 of the present invention.

FIG. 2D is a diagram showing the state of operations when the sft1c instruction is executed, and a'=(n+a)−32 is set as the new value a' for the OFFR of the present invention.

FIG. 3A is a diagram showing the initial state of the VLC data in which n indicates the length of the blank region in BR1, and addr indicates the address to be loaded next in the present invention.

FIG. 3B is a diagram showing the state of operations when the sft01 instruction is executed providing a shift amount a as the operand, and as a result, n+a<32 in the present invention.

FIG. 3C is a diagram showing the state of operations when the ldc instruction is executed, but nothing is done because OFFR<32, in the present invention.

FIG. 3D is a diagram showing the state of operations when the sft1c instruction is executed, but nothing is done because OFFR<32, in the present invention.

FIG. 5A is a diagram showing the initial state of VLC data in which n indicates the length of the blank region in BR0 and BR1, and addr indicates the address to be stored next in the present invention.

FIG. 5B is a diagram showing the state of operations when the wtbr1 instruction is executed, and a VLC with a length a is set in BR1 of the present invention.

FIG. 5C is a diagram showing the state of operations when the sft1 instruction, which is given a VLC length a as its operand, is executed in the present invention.

FIG. 5D is a diagram showing the state of operations when the contents of BR0 are stored in memory by executing the stc instruction, and the contents of AR are incremented by 4 in the present invention.

FIG. 5E is a diagram showing the state of operations when the contents of BR1 are copied to BR0 by executing the cpc instruction, and the value of OFFR is set to n−a+32 in the present invention.

FIG. 6A is a diagram showing the initial state of the VLC data in which n indicates the length of the blank region in BR0 and BR1, and addr indicates the address to be stored next in the present invention.

FIG. 6B is a diagram showing the state of operations when the wtbr1 instruction is executed and a VLC with a length of a is set in BR1 of the present invention.

FIG. 6C is a diagram showing the state of operations when the sft1 instruction, which is given the VLC length a as its operand, is executed in the present invention.

FIG. 6D is a diagram showing the state of operations in which the stc instruction is executed and OFFR>32 in the present invention.

FIG. 6E is a diagram showing the state of operations when the cpc instruction is executed, but nothing is done because OFFR>32 in the present invention.

FIG. 7A is a diagram showing a program example in the present invention.

FIG. 7B is a diagram showing the contents of the registers in the initial state of operation of the present invention.

FIG. 7C is a diagram showing the contents of each register after executing a sft01 instruction, which is given a value of 50 as its operand, in the present invention.

FIG. 7D is a diagram showing the contents of the registers after executing the ldc instruction and the sft1c instruction in the present invention.

FIG. 7E is a diagram showing the contents of the registers after executing the sftof2 instruction in the present invention.

FIG. 7F is a diagram showing the contents of the registers in the final state of the present invention.

FIG. 8 is a diagram showing an example of operations in VLC decode processing in which skip processing is conducted by using the sft01' instruction in the present invention.

FIG. 9A is a diagram showing a program example in the present invention.

FIG. 9B is a diagram showing the contents of the registers in the initial state of operations in the present invention.

FIG. 9C is a diagram showing the contents of each register after executing a sft1 instruction, which is given a value of 45 as its operand, in the present invention.

FIG. 9D is a diagram showing the contents of the registers after executing the stc instruction and the cpc instruction in the present invention.

FIG. 9E is a diagram showing the contents of the registers after executing the sft1of2 instruction in the present invention.

FIG. 9F is a diagram showing the contents of the registers in the final state of the present invention.

FIG. 10 is a diagram showing an example of operations in VLC encode processing in which skip processing is conducted by using the sft1' instruction in the present invention.

DESCRIPTION OF THE PREFERRED EMBODIMENTS

Figure 1:
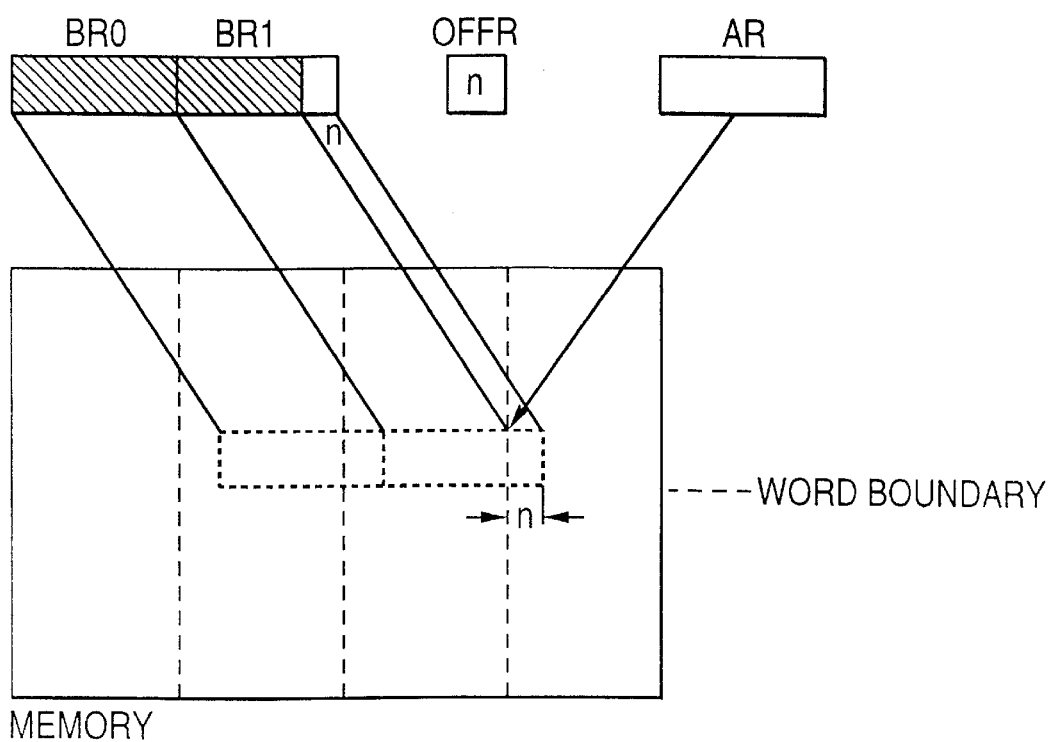
FIG. 1 is a diagram showing the processing format used in the VLC decode processing of the present invention.

Reference will now be made in detail to the preferred embodiments of the present invention, examples of which are illustrated in the accompanying drawings, wherein like reference numerals refer to like elements throughout.

VLC processing can be broadly divided into decode processing and encode processing. The middle-most configuration that executes VLC decode processing according to the present invention is shown in FIG. 1. In FIG. 1, BR0 and BR1 are buffer registers, OFFR is an offset register, and AR is an address register. In VLC decode processing, the VLC data stored in memory is loaded in sequence into the buffer register and processed. However the loading is conducted in data units aligned into word boundaries, and the processed VLC is shifted out to the most significant bit ("MSB") side of the word from the buffer register. BR0 and BR1 have a width equal to that of the load data.

In order to simplify the following, an explanation will be given assuming that the widths of BR0, BR1, and the load/store width are all 32 bit, but the present invention is not limited to this data and variable lengths.

In FIG. 1, the loaded VLC exits in the slanted line portion of BR0 and BR1, and the bit length (n) of the empty portion in BR1, wherein there is no VLC, is stored in the OFFR. In addition, the position in memory where the VLC is placed in BR0 and BR1 is indicated by the dotted line, and the AR points to the address where the loading process should be continued.

In a preferred embodiment of the present invention, the subsequent instructions are provided in the instruction set in order to conduct decode processing.

(1) Left shift instruction (sft01)
    The amount of shift is designated as the operand, and BR0 and BR1 are shifted as linked 64-bit data to the left by only the designated amount. Simultaneously increasing the OFFR value by just the bit amount.
(2) Conditional load instruction (ldc)
    If the OFFR value is 32 or greater, the 32-bit data in memory, which has the AR value as the address, is loaded into BR1, and the AR value is incremented by 4. If the OFFR value is less than 32, nothing is done. This is due to the memory access unit having 32 bits=4 bytes, and the AR value is set to the address of the next four bytes.
(3) Conditional left shift instruction (sft1c):
    If the OFFR value is 32 or more, BR1 is shifted to the left by OFFR-32 bits, and the portion of OFFR-32 bits of the BR0 least significant bits ("LSB") side is replaced by the shifted out bits. Simultaneously, OFFR is reduced by just 32. If OFFR is less than 32, nothing is done.

If the above instructions are used, the setup for the next VLC process is completed by the sft01, ldc, and sft1c instructions being issued in sequence each time there is a single processing of VLC data. This is assuming that more complicated processing such as the above described condition judgements is not necessary. The sft01 operand should provide the bit length of the VLC to be processed.

FIG. 2A through FIG. 2D shows the operation state when the OFFR value is 32 or more as a result of having executed the sft01 instruction.

Figure 2A:
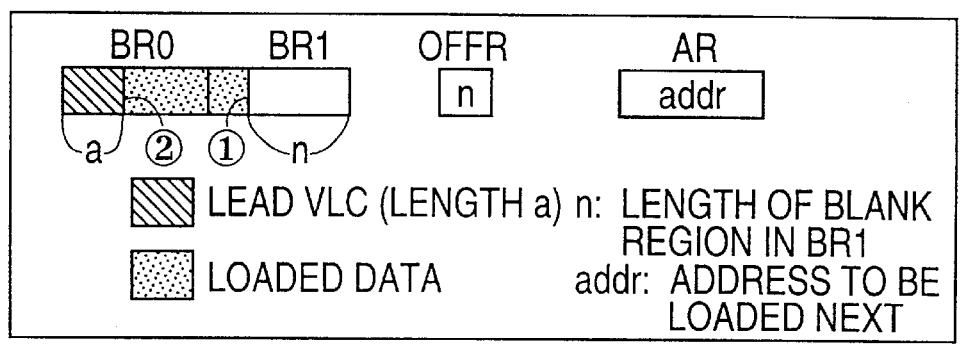
FIG. 2A through FIG. 2D are diagrams showing the results of executing an sft01 instruction and the results when the value of OFFR is 32 bits or more in VLC decode processing of the present invention.

FIG. 2A indicates the initial state in which n indicates the length of the blank region in BR1, and addr indicates the address to be loaded. Furthermore, it should be noted that the boundary indicated by ① is the word boundary and does not necessarily indicate the VLC boundary. Also, the boundary indicated by ② is the VLC boundary and does not necessarily indicate the word boundary.

Figure 2B:
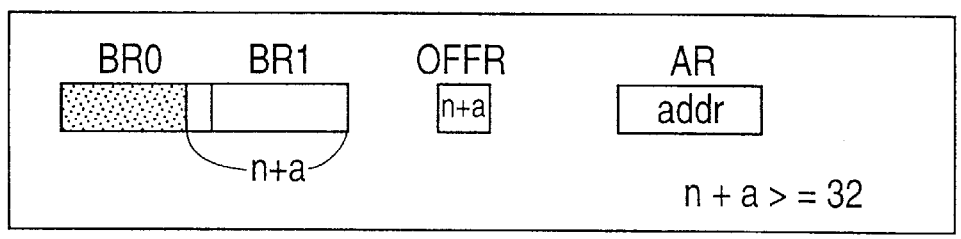

FIG. 2B indicates the state of operations when the sft01 instruction is executed in which shift amount a is supplied as the operand, and as a result, n+a>=32.

Figure 2C:
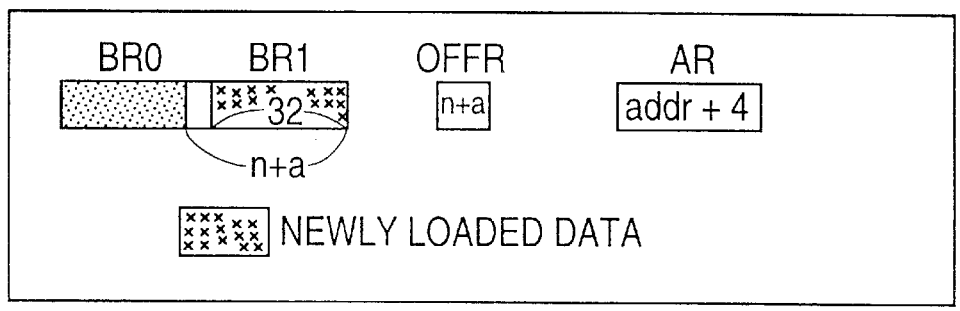

FIG. 2C indicates the state of operations when the ldc instruction is executed, and new data is loaded in BR1.

Figure 2D:
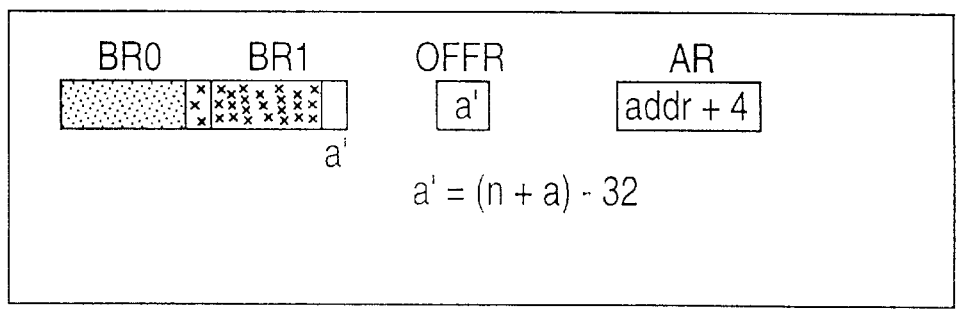

FIG. 2D indicates the state of operations when the sft1c instruction is executed, and a'=(n+a)−32 is set as the new value a' for the OFFR.

FIG. 3A through FIG. 3E shows the operation state when the OFFR value is less than 32 as a result of having executed the sft01 instruction.

Figure 3A:
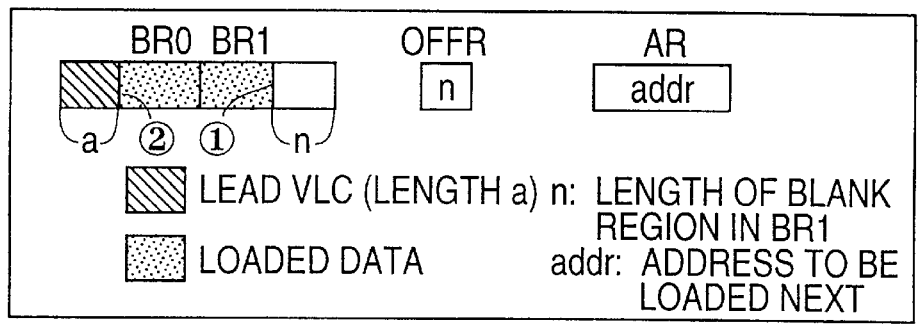
FIG. 3A through FIG. 3D are diagrams showing the results of executing the sft01 instruction and the state of operations when the value of OFFR has become less than 32 in VLC decode processing of the present invention.

FIG. 3A is a diagram that indicates the initial state of operations in the same manner as FIG. 2A in which n indicates the length of the blank region in BR1, and addr indicates the address to be loaded next. Furthermore, it should be noted that the boundary indicated by ① is the word boundary and does not necessarily indicate the VLC boundary. Also the boundary indicated by ② is the VLC boundary and does not necessarily indicate the word boundary.

Figure 3B:
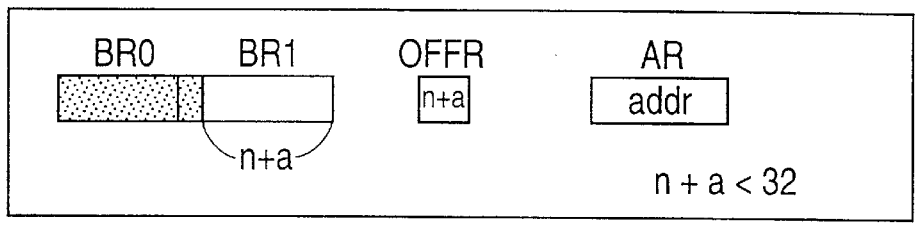

FIG. 3B indicates the state of operations when the sft01 instruction is executed with the shift amount a as the operand, and as a result, n+a<32.

Figure 3C:
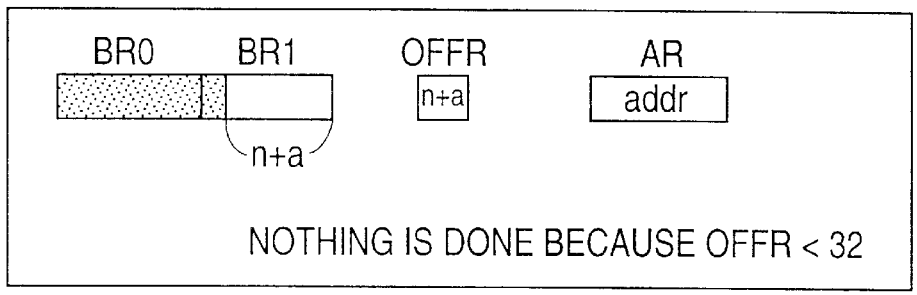

FIG. 3C indicates the state of operations when the ldc instruction is executed, but because OFFR<32, nothing actually happens. At this time, the ldc instruction is equal to an NOP (no operation) instruction.

Figure 3D:
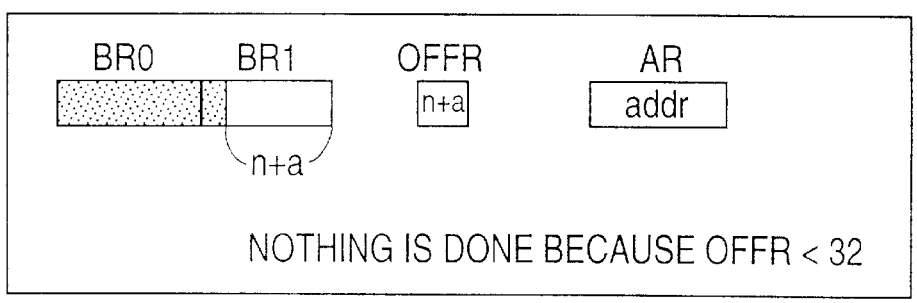

FIG. 3D indicates the state of operations when the sft1c instruction is executed but because OFFR<32, nothing actually happens. At this time, the sft1c instruction is equal to the NOP instruction.

As described above, the ldc instruction and the sft1c instruction are executed as in FIG. 2A through FIG. 2D, but do not accomplish any change in FIG. 3A through FIG. 3D. The fact that both of these instructions can be processed by the same program may be cited as an effect of the present invention. Specifically, it is not necessary to provide a instruction that determines the status and causes branching in different processing steps, and therefore this simplifies the program preparation and execution.

Figure 4:
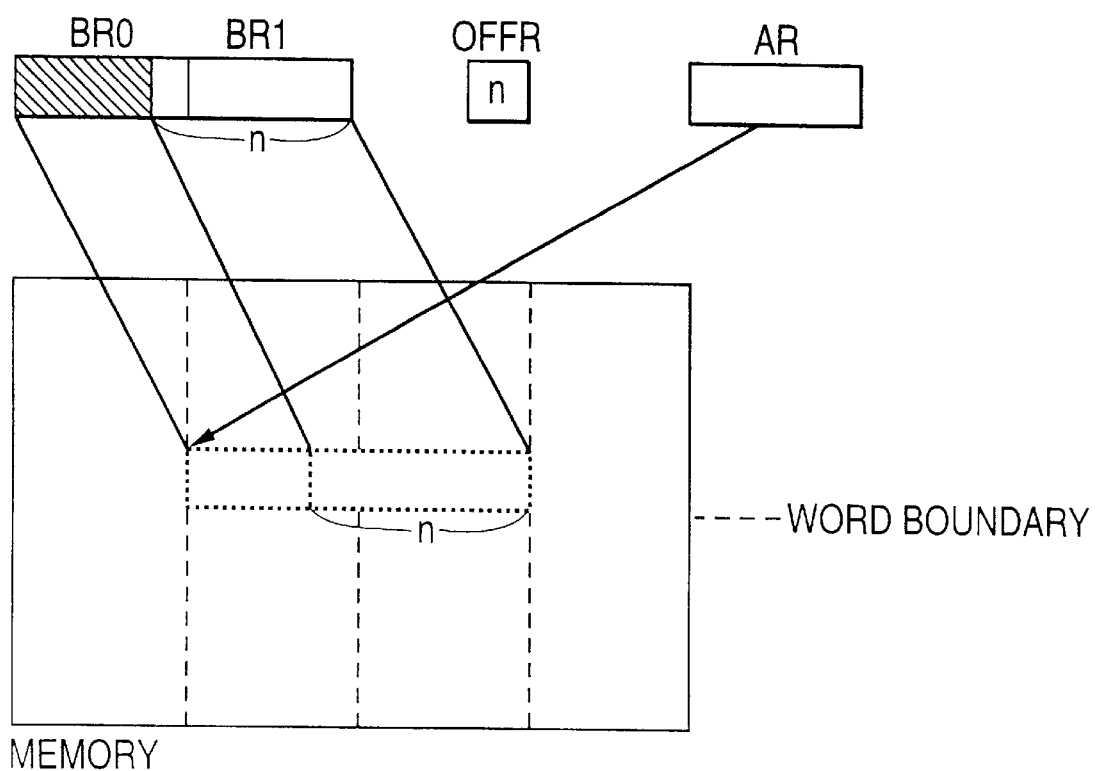
FIG. 4 is a diagram showing the processing format of the VLC data encode processing operation of the present invention.

FIG. 4 indicates the intermediate state of operations in which VLC encode processing is conducted according to the present invention. The registers indicated in FIG. 4 are the same as those indicated in FIG. 1. In VLC encode processing, the coded VLC data is stored in memory in sequence. The data to be stored exists in the 64-bit region of BR0 and BR1 with the BR0 MSB side as the lead. In FIG. 4, the slanted line portion of BR0 is the applicable portion. In addition, the length of the blank region of BR0 and BR1 (as indicated by n in FIG. 4) is stored in the OFFR. The AR holds the memory address to be stored.

In another embodiment of the present invention, the subsequent instructions are provided in the instructions set in order to conduct encode processing.

(4) BR1 write instruction (wtbr1)

32-bit data provided as the operand is set in BR1.

(5) Left shift instruction (sft1)

The code length is designated as the operand. BR1 is shifted OFFR-32 bits to the left, and the portion of OFFR-32 bits of the BR0 LSB side is replaced by the bits shifted out. Simultaneously, the OFFR value is reduced by the operand.

(6) Conditional store instruction (stc)

If the OFFR value is 32 or less, the 32-bit data in BR0 is stored in the location in memory that has the AR value as the address, and the AR value is incremented by 4.

(7) Conditional copy instruction (cpc):

If the OFFR value is 32 or less, BR1 is copied to BR0, and simultaneously, the value of OFFR is incremented by 32. If the OFFR value is greater than 32, nothing is done.

Using the above instructions, it is possible to process one unit of VLC in the following order: the VLC is set in BR1 by the wtbr1 instruction; it is linked with the unstored data that is in BR0 by the sft1 instruction; it is stored by the stc instruction; and the data remaining in BR1 is not stored, but is moved by the cpc instruction to BR0 in order to be ready for the next store operation. The bit length of the VLC to be processed may be provided as the operand of the sft1 instruction.

The execution of the sft1 instruction in FIG. 5 results in an operation wherein the value of OFFR becomes a value that does not exceed 32, and the execution of the sft1 instruction in FIG. 6 results in an operation wherein the value of OFFR becomes a value that does exceed 32.

Figure 5A:
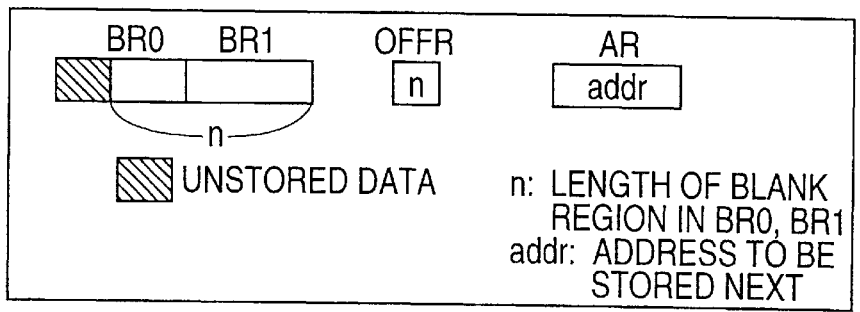
FIG. 5A through FIG. 5E are diagrams showing the state of operations when the sft1 instruction is executed and the value of OFFR does not exceed 32 in VLC encode processing in the present invention.

FIG. 5A is a diagram that indicates the initial state of VLC where n indicates the length of the blank region in BR0 and BR1, and addr indicates the address to be stored next.

Figure 5B:
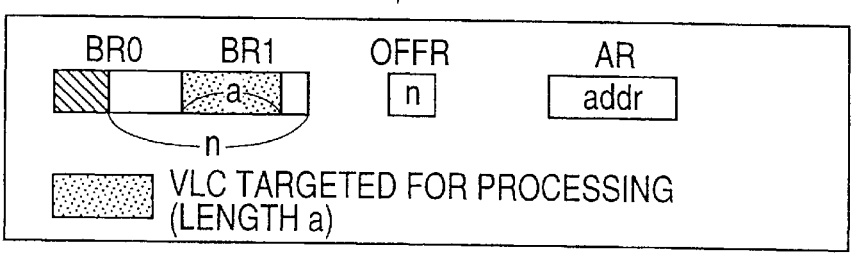

FIG. 5B indicates the state of operations when the wtbr1 instruction is executed, and a VLC with a length of a is set in BR1.

Figure 5C:
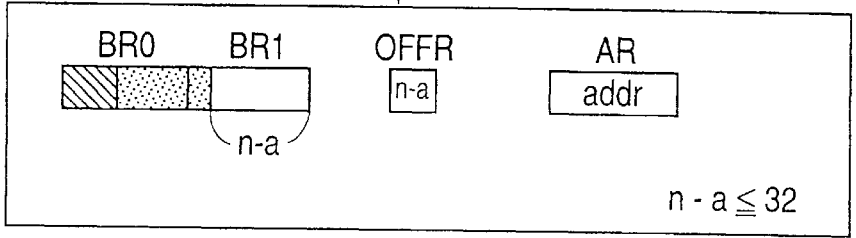

FIG. 5C indicates the state operations when the sft1 instruction, which is given VLC length a as its operand, is executed, and as a result, the VLC within BR1 is linked with the unstored data in BR0, and the OFFR value becomes n−a.

Figure 5D:
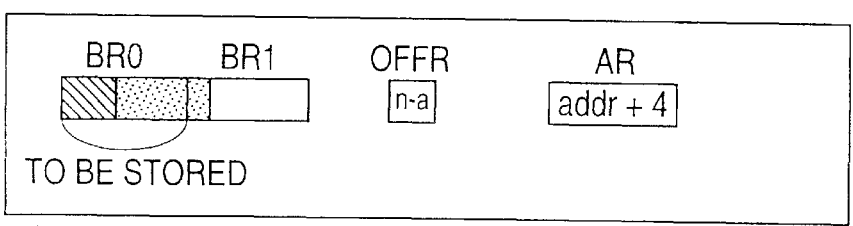

FIG. 5D indicates the state of operations when the contents of BR0 are stored in memory when the stc instruction is executed, and the contents of AR are incremented by 4.

Figure 5E:
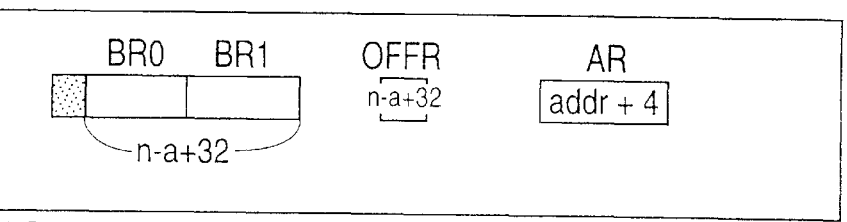

FIG. 5E indicates the state of operations when the contents of BR1 are copied to BR0 by executing the cpc instruction, and the value of OFFR is set to n−a+32.

FIG. 6A through FIG. 6E are diagrams showing the results of executing the sft1 instruction and the state of operations when the value of OFFR exceeds 32 in VLC encode processing of the present invention.

Figure 6A:
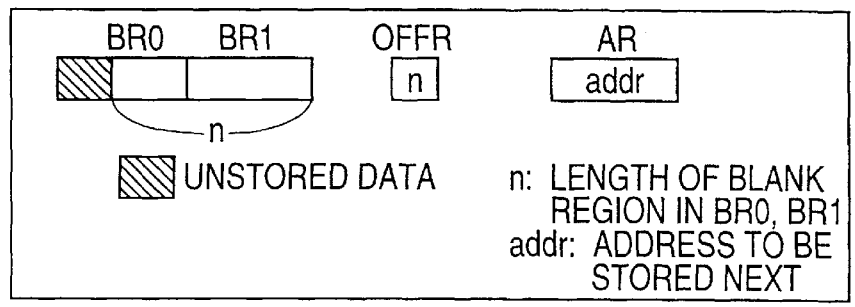
FIG. 6A through FIG. 6E are diagrams showing the state of operations when the sft1 instruction is executed and the value of OFFR exceeds 32 in VLC encode processing of the present invention.

FIG. 6A is a diagram indicating the initial state of operations in the same manner as in FIG. 5A, where n indicates the length of the blank region in BR0 and BR1, and addr indicates the address to be stored next.

Figure 6B:
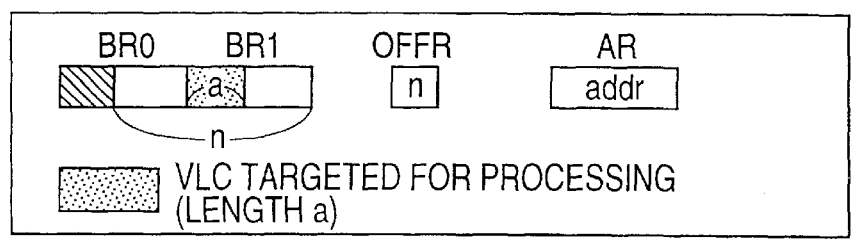

FIG. 6B indicates the state of operations when the wtbr1 instruction is executed in the same manner as in FIG. 5B, and a VLC with a length of a is set in BR1.

Figure 6C:
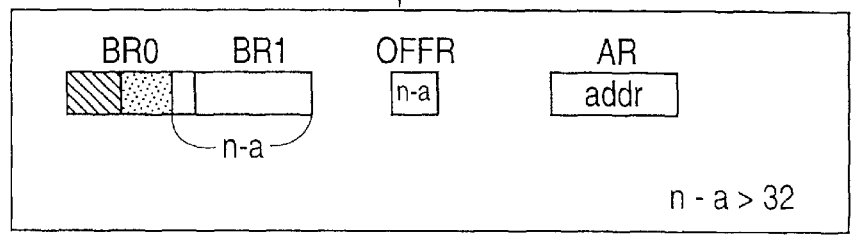

FIG. 6C indicates the state operations when the sft1 instruction, which is given the VLC length a as its operand in the same manner as in FIG. 5C, is executed, the VLC within BR1 is linked to the unstored data in BR0, and the OFFR value becomes n−a.

Figure 6D:
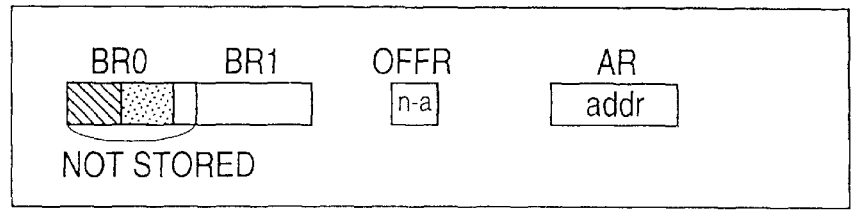

FIG. 6D indicates the state operations in which the stc instruction is apparently executed, but because OFFR>32, nothing is actually changed. At this time, the stc instruction is equivalent to the NOP instruction.

Figure 6E:
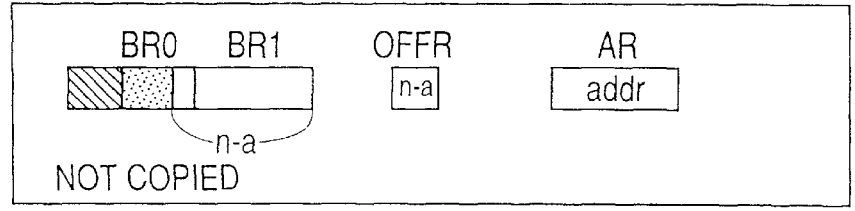

FIG. 6E indicates the state operations when the cpc instruction is apparently executed, but because OFFR>32, nothing is actually changed. At this time, the cpc instruction is equivalent to the NOP instruction.

In FIG. 5, the stc and cpc instructions are executed and operate, but in FIG. 6 they are executed but do not operate. The fact that both of these instructions can be processed by the same program may be cited as an effect of the present invention. Specifically, it is not necessary to provide a instruction that determines the status and causes branching into differing processing steps, and therefore this simplifies the program preparation.

In the explanation of this embodiment of the present invention described above, the fundamental parts configuring the present invention were described, but in realizing the present invention, the forms of the present invention indicated below are possible.

a) In the explanation described above, the loading and storing between BR0 and BR1 were executed by using the VLC storage location as the memory location, but when the present invention is executed on a custom system, a VLC custom buffer memory may be separately provided for the normal memory, and then transferred between BR0 and BR1. In this situation, AR would point to the buffer memory.

b) Because the stc instruction and the cpc instruction have the same operation conditions, and there is neither duplication nor dependence on the computer to be used, they may be combined into one instruction.

c) It is possible to arrange it so that AR can be allocated to a general purpose register, not a special register, and thereby can be used like a base register of a general load/store instruction.

d) A target register may be given in the operand of the sft01 instruction so that the part shifted out is stored in the target register.

e) As a result of having executed the wtbr1 instruction, the VLC data placed in BR1 may be on the LSB side of BR1.

In this case, the amount of shift in the sft1 instruction becomes OFFR−(minus) code length.

f) The amount of shift of the sft01 instruction and the sft1 instruction is established by the code length. However, if the code system is made so that the code length is determined by the number of lead bits of the VLC, the amount of shifting can be determined by the contents of BR0 and BR1 without providing the code length as the operand, and therefore, the operand becomes unnecessary.

g) It is also possible to provide a flag or an interrupt signal to indicate that the destination to which the AR points has arrived at the end of the VLC region.

In addition, in VLC processing, sometimes skip processing is necessary. This skip processing is processing in which a region of some bits in memory is skipped over, and writing is done in an open space. If the length of the skip is the width of BR0 and BR1 or less, the framework processing described above can be used. However, if the length is greater, it is necessary to conduct processing to make a separation within the width of BR0 and BR1. An explanation of the function for the purpose of reducing this processing is explained below.

With decoding, the length to be skipped is provided to the operand of the sft01 instruction, but even if that is longer than 32 bits, the following mechanism is adopted so that the program will operate without contradictions.

An offset register OFFR2 and flag register FGR are introduced as new registers in this processing. When an amount of shifting exceeds 32 as designated by the sft01 instruction, the same operations are taken as those when 32 is designated, and the difference between the amount of shift and 32 is set in OFFR2. Also, FGR is set to 1. In addition, a sftof2 instruction is introduced to execute the following operations, and if FGR is 1, the processing flow branches into the instruction sequence of the sftof2 instruction, the ldc instruction, and the sft1c instruction, and this instruction sequence is repeatedly executed until FGR becomes 0.

(8) sftof2 instruction
When OFFR2 is 32 or less, BR0 and BR1 are shifted as linked 64-bit data to the left by the value of OFFR2. At the same time, the value of OFFR is incremented by the amount of shift, and OFFR2 and FGR are set to 0. If OFFR2 is larger than 32, BR0 and BR1 are shifted 32 bits to the left as linked 64 bit data. At the same time, the value of OFFR is incremented by 32, and OFFR2 is reduced by 32.

In this process, a conditional branch instruction based on the value of FGR is necessary. An example of the operation based on this process is shown in FIG. 7. FIG. 7 provides an example of a VLC that has 40 bits remaining in BR0 and BR1 with 50 bits being skipped.

FIG. 7A through FIG. 7F are diagrams showing operations in the VLC decode processing in which skip processing is conducted by using the sftof2 instruction.

Figure 7A:
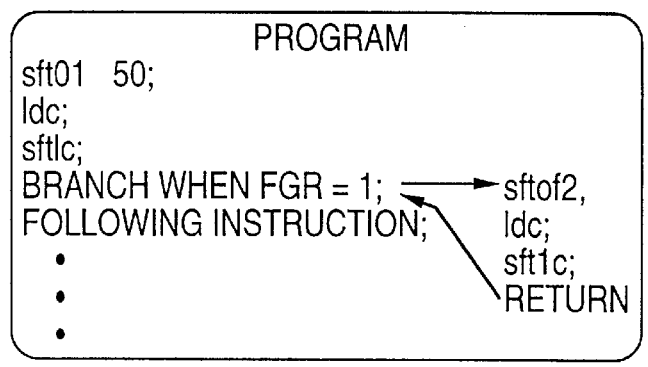
FIG. 7A through FIG. 7F are diagrams showing operations in the VLC decode processing in which skip processing is conducted by using the sftof2 instruction in the present invention.

FIG. 7A shows a program example with the variables in their initial states.

Figure 7B:
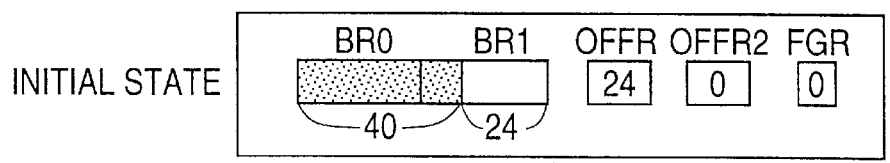

FIG. 7B indicates the contents of the registers in the initial state.

Figure 7C:
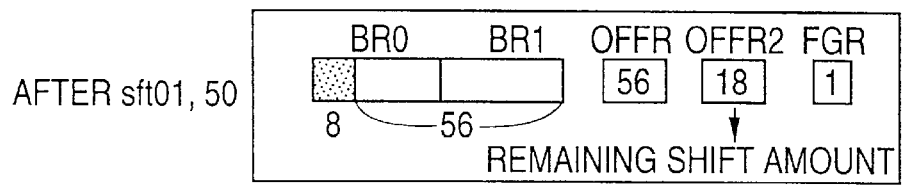

FIG. 7C indicates the contents of each register after executing a sft01 instruction that has been given 50 as the operand value.

Figure 7D:
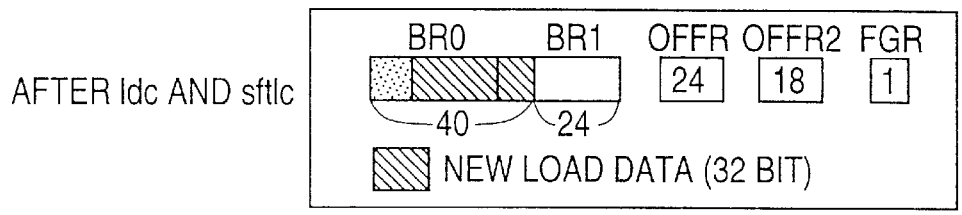

FIG. 7D indicates the contents of the registers after executing the ldc instruction and the sft1c instruction.

Figure 7E:
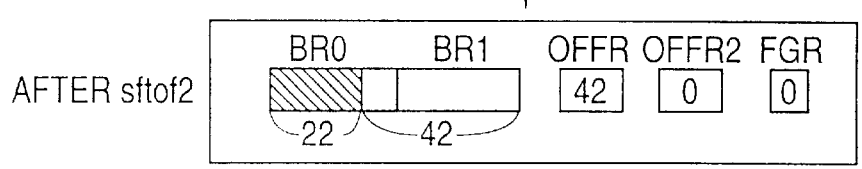

FIG. 7E indicates the contents of the registers after executing the sftof2 instruction. In this example, because the contents of OFFR2 are 32 or less, the FGR is set to 0 by the execution of the first sftof2 instruction, and the operation repeating the sftof2 instruction is not executed.

Figure 7F:
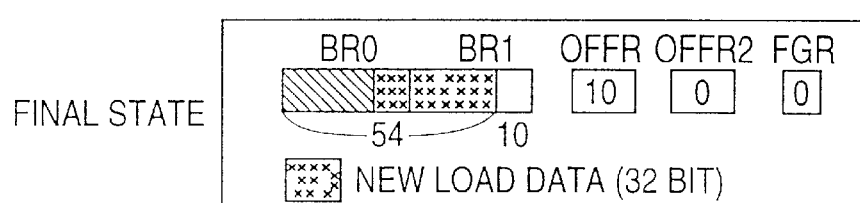

FIG. 7F indicates the contents of the registers in the final state of operation.

In addition, without introducing a sftof2 instruction, it is possible to respond by changing the operation of sft01 instruction to the sft01' instruction below.

(9) sft01' instruction:
If the FGR value is 0, this operates in the same way as the original sft01 instruction, and if the FGR value is 1, the operation is the same as that of the aforementioned sftof2 instruction.

If the above is done, it is possible to respond just by placing a conditional branch instruction so that the flow returns to the sft01' instruction when the FGR is 1 at the end of processing, and the program is similar to that in FIG. 8.

With regards to an encoding operation, the length of bits to be skipped is provided in the operand of the sft1 instruction, and if this is greater than 32 bits, the OFFR2 and the FGR are used to respond in the same manner as with decoding. If an amount of shifting exceeds 32 is designated by the sft1 instruction, the operation is the same as that when 32 has been designated. Specifically, the difference between the amount of shifting and 32 is set in OFFR2, and FGR is set to 1. Furthermore, a sft1of2 instruction is introduced to execute the following operations, when the FGR is 1, the flow branches into a instruction sequence of the sft1of2 instruction, the stc instruction, and the cpc instruction, and this instruction sequence is repeated until FGR becomes 0.

(10) sft1of2 instruction:
If OFFR2 is 32 or less, BR1 is shifted OFFR-32 bits to the left, and a OFFR-32 bit portion of the BR0 LSB side is replaced by the bits shifted out. At the same time, the value of the OFFR is reduced by the value of OFFR2, and OFFR2 and FGR are set to 0.

If OFFR2 is larger than 32, BR1 is shifted 32 bits to the left, and a OFFR-32 bit portion of the BR0 LSB side is replaced by the bits shifted out. At the same time, the values of OFFR and OFFR2 are each reduced by just 32.

In this process, a conditional branch instruction based on the value of FGR is necessary. An example of the operation based on this process is shown in FIG. 9A through FIG. 9F. FIG. 9A through 9F shows an example of a VLC that has 10 bits remaining in BR0 and BR1, and 45 bits which are skipped.

Figure 9A:
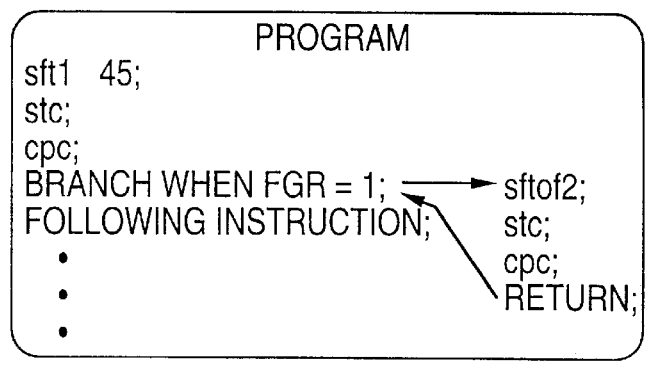
FIG. 9A through 9F are diagrams showing an example of operations in VLC encode processing in which skip processing is conducted by using the sft1of2 instruction in the present invention.

FIG. 9A shows a program example.

Figure 9B:
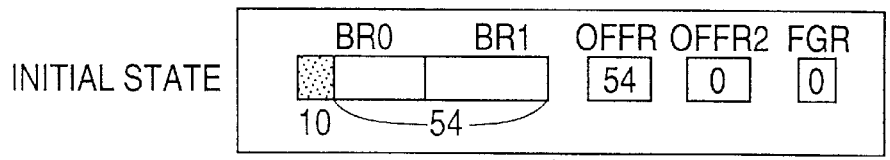

FIG. 9B indicates the contents of the registers in the initial state of the example.

Figure 9C:
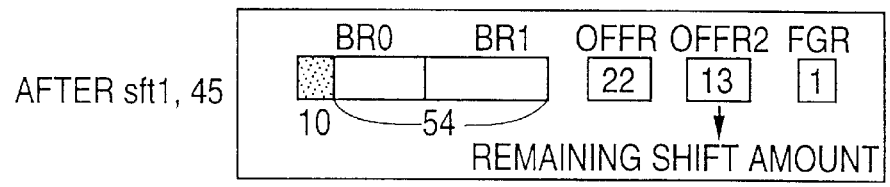

FIG. 9C indicates the contents of each register after executing a sft1 instruction that has been given 45 as the operand.

Figure 9D:
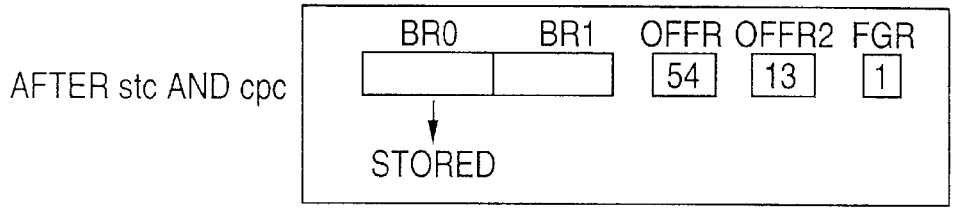

FIG. 9D indicates the contents of the registers after executing the stc instruction and the cpc instruction.

Figure 9E:
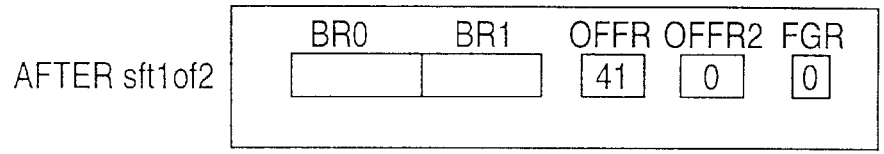

FIG. 9E indicates the contents of the registers after executing the sft1of2 instruction. In this example, because the contents of OFFR2 are 32 or less, the FGR is set to 0 by the execution of the first sft1of2 instruction, and the operation repeating the sft1of2 instruction is not conducted.

Figure 9F:
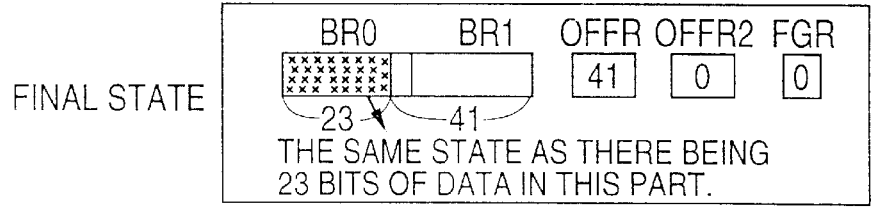

FIG. 9F indicates the contents of the registers in the final state of operation.

Still referring to FIG. 9A through FIG. 9F, when there is 10 bits of VLC in BR0 in the initial state, a blank space of 45 bits is entered behind that VLC, in other words, the next VLC will be stored at a distance of 45 bits. The following operations are then performed.

First, in the initial storage, the 10 bits of VLC and 22 bits of blanks in BR0 will be stored. Afterwards, the 45−22 =23 bits of blank is entered, and for that reason, the OFFR value is established so that 23 bits of VLC are in BR0, and the OFFR is changed to 41 by the sft1of2 instruction. If encoding is continued after the final state, the expected results are obtained because the subsequent VLC continues after the 23 bits on the left side of BR0.

In addition, without introducing a sft1of2 instruction, it is possible to respond by changing the operation of sft1 instruction to the sft1' instruction below.

(9) sft1' instruction:

If the FGR is 0, this operates in the same way as the original sft01 instruction, and if FGR is 1, the operation is the same as that of the aforementioned sft1of2 instruction.

It is now possible to respond just by placing a conditional branch instruction so that the flow returns to the sft1' instruction when the FGR is 1 at the end of processing, and the program becomes similar to that shown in FIG. 10.

Figure 11:
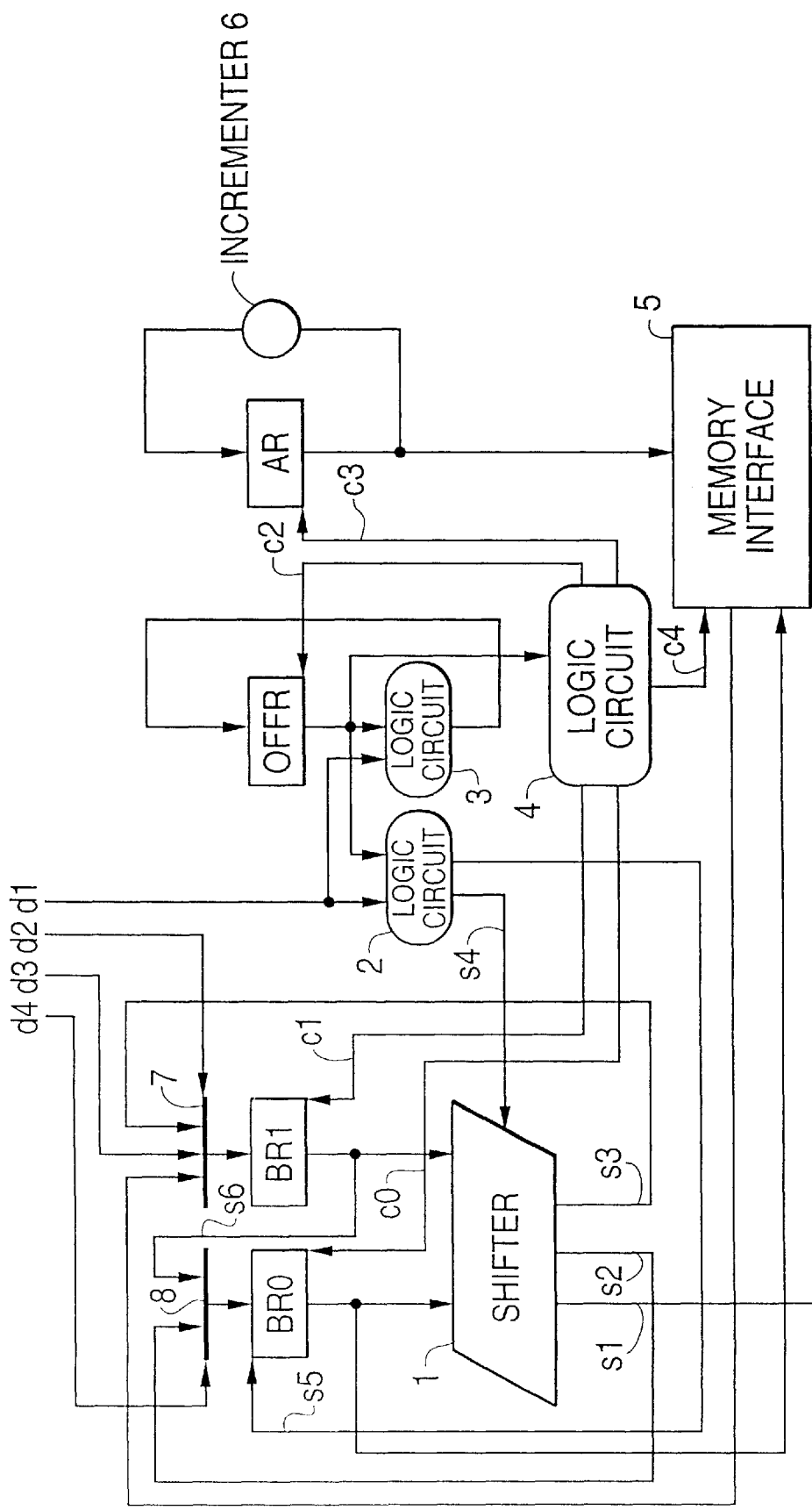
FIG. 11 is a diagram showing a circuit configuration of one embodiment of the present invention.

FIG. 11 shows an example of a circuit configuration of an embodiment of the present invention. In FIG. 11, numeral 1 is a shifter, numerals 2 through 4 are logic circuits, numeral 5 represent a memory interface part, numeral 6 is an incrementer, and numerals 7 and 8 represent selectors. Also in FIG. 11, items d1 through d4 are input signals (lines) from the instruction decoder, which is not shown in the diagram, and items c0 through c4 are various signals (lines) to control the operations.

Thirty-two bits of data each are input into BR0 and BR1, and are shifted left as linked 64 bit data with BR0 as the MSB side.

The amount of shifting is provided by s4. In this embodiment, the output becomes 96-bit long because the range of the amount of shifting is 0 through 32 bits. The output data is indicated from the MSB side at s1, s2, and s3, which are 32 bits each.

In FIG. 11, logic circuit 2 is a circuit to determine the amount of shift. Logic circuit 3 is a circuit to determine the upgrade value for the OFFR, and logic circuit 4 is a circuit to determine the conditions for the conditional instructions.

The operations in FIG. 11 when each instruction is executed as described above will be explained below.

sft01 INSTRUCTION

The amount of shifting provided as an operand is input to logic circuit 2 from d1, and that is presented unchanged to shifter 1 as s4. Outputs s2 and s3, which are the results of shifting, are the new values of BR0 and BR1 respectively. Selector signals d2 and d4 become the values to select s3 and s2. In addition, d1 is also input into logic circuit 3, and is added to the OFFR value in logic circuit 3, and becomes the new value of OFFR.

ldc INSTRUCTION

The memory value, which takes the AR value as the address, is read out through memory interface part 5, and is written into BR1. At the same time, a positive value of 4 is added to the AR value by incrementer 6. Also, selector signal d2 becomes the value to select the load value.

However, all these operations are suppressed if OFFR is less than 32. The condition determination is conducted by logic circuit 4, and when suppressed, each part is notified by asserting c1, c2, and c4.

sft1c INSTRUCTION

The amount of shifting is calculated as OFFR−32 by logic circuit 2, and transmitted to shifter 1. The prior value of BR0 is replaced with just the OFFR−32 portion of the LSB side of the s2 shift results. The suppression command is output by logic circuit 2, in which only one part of BR0 is substituted, and is realized by signal s5. In addition, logic circuit 3 calculates OFFR−32 which becomes the new value of OFFR.

However, all the above operations are suppressed if OFFR is less than 32. The condition determination is conducted by logic circuit 4, and when suppressed, each part is notified by asserting signals c0 and c2.

wtbr1 INSTRUCTION

Data provided as the operand is input from d3, and written into BR1 in this instruction.

sft1 INSTRUCTION

Logic circuit 2 calculates OFFR−32, and transmits the result to shifter 1 as the amount of shifting. The value of the prior BR0 is replaced with only the OFFR−32 portion of the LSB side of s2 shift results. Logic circuit 2 outputs a suppression signal, in which only one part of BR0 is substituted and is realized by signal s5. In addition, the code length, which is provided by the operand, is input from d1. Also, OFFR-code length is calculated by logic circuit 3, and this becomes the new value of OFFR.

stc INSTRUCTION

In this instruction, taking the AR value as the address, the value of BR0 is stored in memory through memory interface part 5. At the same time the AR value is increased by a positive value of 4 by incrementer 6.

However, if the OFFR is larger than 32, all these operations are suppressed. This condition determination is conducted by logic circuit 4, and if they are suppressed, all parts are notified by asserting signals c3 and c4.

cpc INSTRUCTION

The value of BR1 is copied to BR0 through signal s6, and at the same time, OFFR+32 is calculated by logic circuit 3, and becomes the new value of OFFR.

However, if the OFFR is larger than 32, all these operations are suppressed. This condition determination is conducted by logic circuit 4, and if they are suppressed, all parts are notified by asserting signals c0 and c2.

The following operational circumstances can be adopted as examples of transformations of the aforementioned embodiment.

(a) The target of memory interface part 5 may not be the normal memory, but rather is a VLC buffer memory.

(b) The AR is not a separate register, but rather, it is a general-purpose register. The number of the general-purpose register is stipulated as the operand of the ldc instruction or the stc instruction.

(c) In order to stipulate the target operand, s1 in the diagram is stored in the target general-purpose register.

(d) The amount of shifting of the sft1 instruction, calculated by logic circuit 2 shall be 32-the operand value. The operand value is provided by output d1.

(e) The functions of the stc instruction and the cpc instruction are executed by a single instruction.

Figure 12:
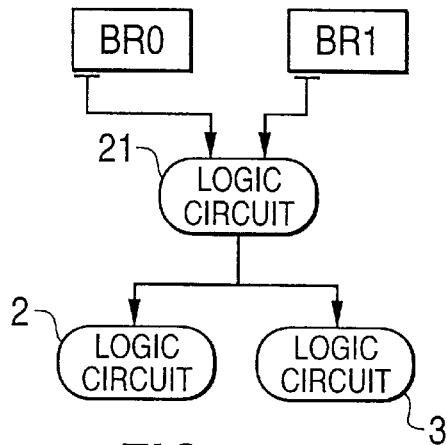
FIG. 12 is a diagram showing an example of a configuration that calculates the amount of shift by inputting the necessary bit value of the most significant bit ("MSB") side from BR0 or BR1 in the present invention.

Next, in FIG. 12 an example is provided in which the amount of shifting is not provided by the operand of the sft01 instruction and the sft1 instruction. Instead, the amount of shifting is provided by inputting the necessary bit value of the MSB side from BR0 or BR1 and calculating the amount of shift. In FIG. 12, BR0, BR1, logic circuit 2, and logic circuit 3 are the same as in FIG. 11. Instead of signal d1 being input by logic circuit 2 and logic circuit 3 as in FIG. 11, in FIG. 12, the output of logic circuit 21 is provided to logic circuits 2 and 3. Logic circuit 21 is a circuit used to calculate the code length of the code from the pattern received from the MSB side. The number of bits necessary to calculate the code length from the head of BR0 and BR1 is input into the circuit, and the code length is output.

Figure 13:
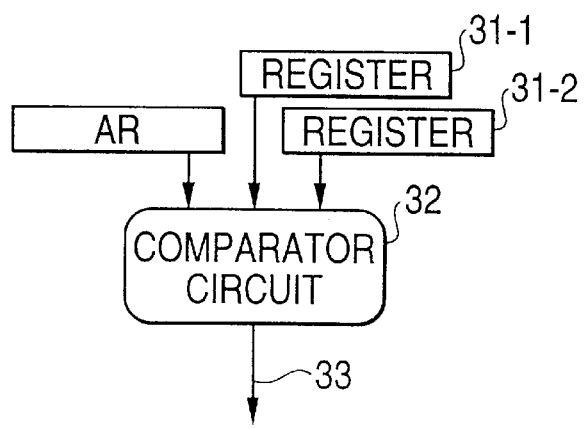
FIG. 13 is a diagram showing an example of a configuration to notify the ldc and stc instruction that the range, separately determined when the AR value was incremented, has been exceeded in the present invention.

FIG. 13 shows an example of a configuration to notify the ldc and stc instructions that the range, separately determined when the AR value was incremented, has been exceeded. In FIG. 13, AR is the same as in FIG. 11, and 31-1 and 31-2 are registers that can be set by software, 32 is a comparator circuit, and 33 is a signal line. Comparator circuit 32 always compares the values of registers 31-1 and 31-2 with AR, and if the AR value is not in the range stipulated by registers 31-1 and 31-2, signal 33 becomes 1. Signal 33, for example, is recognized as an interrupt signal, and access outside the range to which VLC is placed can be stopped.

Figure 14:
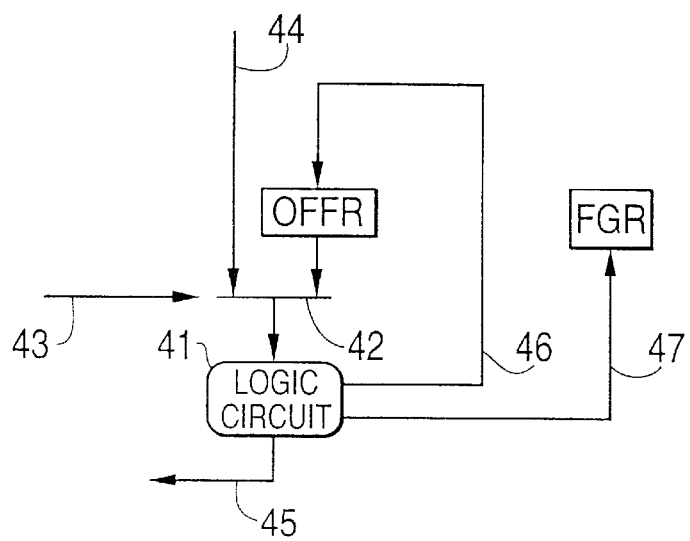
FIG. 14 is a diagram showing an example of a configuration executing the skip operation in VLC decode and encode processing of the present invention.

Next, FIG. 14 shows an example of a configuration in which the skip operation is executed in VLC decode and encode processing. FIG. 14 shows the functioning of logic circuit 2 in FIG. 11 in which the portion related to the sft01 instruction and the sft1 instruction is substituted. In FIG. 14, item 41 is a logic circuit, item 42 is a selector, and items 43 through 47 are signal lines.

Logic circuit 41 determines whether the value of the input signal is greater than 32, and if it is greater, 32 is output to signal 45, the difference between the input value and 32 is output to signal 46, and a value of 1 is output to signal 47. In addition, if the input value is 32 or less, the input value itself is output to signal 45, 0 is output to signal 46, and the value 0 is output to signal 47. Signal 43 is the selector signal to selector 42. Various kinds of skip processing are conducted as described below.

(1) In VLC decode processing, skip processing is executed using the sftof2 instruction.

Signal 43 is the instruction decoder output signal, and when the sft01 instruction is executed, a value that selects signal 44 is provided, and when the sftof2 instruction is executed, a value that selects the OFFR2 value is provided. In addition, signal 44 is an operand when the sft01 instruction is executed, and is the same as d1 in FIG. 11. Signal 45 is the same as s4 in FIG. 11, and is used as the amount of shifting by shifter 1. The value of signal 47 is set in the FGR.

(2) In VLC decode processing, skip processing is executed using the sft01' instruction.

Signal 43 is not the output of the instruction decoder, but rather becomes the FGR value, and if the FGR is a value of 0, selector 42 selects signal 44, and if it is a value of 1, it selects the value of OFFR2.

(3) In VLC encode processing, skip processing is executed using the sft1of2 instruction.

The same operations are conducted as in (1) above. However, signal 45 is input into logic circuit 3 of FIG. 11 as a signal equivalent to d1 of FIG. 11.

(4) In VLC encode processing, skip processing is executed using the sft1' instruction.

The same operations are conducted as in (2). However, signal 45 is input into logic circuit 3 of FIG. 11 as a signal equivalent to d1 of FIG. 11.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A data processing device having a variable length code processing mechanism, comprising:

an address register to store access addresses in a memory;

a first buffer register to store data loaded from said memory, wherein said first buffer register has a bit width at least equal to a load data width from said memory;

a second buffer register connected to said first buffer register, and to which the contents of said first buffer register are shifted and stored;

an offset register for storing a length of an empty region produced in a linked region which is configured by linking said first buffer register and said second buffer register when the data is packed and stored into an unlinked end of said second buffer register;

first processing means for shifting the data, which exists in said linked region and which is packed and stored in the unlinked end of said second buffer register, to the unlinked end of said second buffer register by a specified amount, and that simultaneously increments said offset register value by the shift amount;

second processing means for loading the data held in memory addressed by the value of the address register, in said first buffer register, and for simultaneously incrementing the value of said address register by a specified amount when the value of said offset register is equal to or greater than the value of a bit width of said first buffer register, wherein
said second processing means for taking no action when the value of said offset register is less than the bit width of said first buffer register; and third processing means for shifting the contents of said first buffer register, which said second processing means has loaded from memory, to said second buffer register by a number of bits equal to the contents of the offset register minus the first buffer register bit width, for substituting a bit portion of a linked end of said second buffer register, which is equal to the contents of the offset register minus the first buffer register bit width, with the bits shifted out from said first buffer register, and for simultaneously decrementing the value of said offset register by the number of said buffer register bits when the value of said offset register is equal to or greater than the value of the bit width of said first buffer register, wherein
said third processing means for taking no action when the value of said offset register is less than the bit width of said first buffer register.

2. A data processing device having a variable length code processing mechanism, comprising:

an address register to store access addresses in memory;

a first buffer register having a bit width at least equal to a load data width from said memory to store data loaded from said memory;

a second buffer register, which is connected to said first buffer register, and to which the contents of said first buffer register is shifted and stored;

an offset register for storing a length of an empty region produced in a linked region which is configured by linking said first buffer register and said second buffer register when the data is packed and stored into an unlinked end of said second buffer register;

a first shift instruction that designates a shift amount as an operand, shifts the data existing in said linked region to the unlinked end of said second buffer register by the shift amount, and simultaneously increments said offset register value by shift amount;

a conditional load instruction that loads the data held in memory addressed by the value of said address register, in said first buffer register, and simultaneously increments the value of said address register by a specified amount when the value of said offset register is equal to or greater than the value of a bit width of said first buffer register, wherein
said conditional load instruction takes no action when the value of said offset register is less than the bit width of said first buffer register; and a second shift instruction that shifts the contents of said first buffer register, which said conditional load instruction has loaded from memory, to said second buffer register by a number of bits equal to the contents of the offset register minus the first buffer register bit width, substitutes a bit portion of a linked end of said second buffer register, which is equal to the contents of the offset register minus the first buffer register bit width, with the bits shifted out from said first buffer register, and simultaneously decrements the value of said offset register by the number of said buffer register bits when the value of said offset register is equal to or greater than the value of a bit width of said first buffer register, wherein said second shift instruction takes no action when the value of said offset register is less than the bit width of said first buffer register.

3. A data processing device having a variable length code processing mechanism as recited in claim 2, further comprising:

a second offset register to set a difference between said shift amount specified as the operand of said first shift instruction and the bit width of said first buffer register;

a flag register that is set when said first shift instruction designates the shift amount that exceeds the bit width of said first buffer register; and a third shift instruction that shifts the linked region of said first and second buffer registers to the unlinked end of said second buffer register by a value of said second offset register, and simultaneously increments the value of said offset register by the shift amount and sets said second offset register and flag register to 0 when the value of said second offset register does not exceed the bit width of said first buffer register, wherein said third shift instruction shifts the linked region of said first and second buffer registers to the unlinked end of said second buffer register by the bit width portion of said first buffer register, and simultaneously increments the value of said offset register by the number of bits of said first buffer register and reduces the value of said second offset register by the number of bits of said first buffer register when the value of said second offset register does exceed the bit width of said first buffer register; and wherein when said first shift instruction designates a shift amount that exceeds the bit width of said first buffer register and when the value of said flag register is 1 after the first shift instruction, the conditional load instruction and the second shift instruction are executed, a flow branches into a instruction sequence comprising said third shift instruction, said conditional load instruction and said second shift instruction, and said instruction sequence is repeated until said flag register value becomes 0.

4. A data processing device having a variable length code processing mechanism as recited in claim 2, wherein:

said address register is no custom register provided; and a general register, which can be designated as an operand of said conditional load instruction, is used as said memory access address register.

5. A data processing device having a variable length code processing mechanism as recited in claim 2, wherein:

said first shift instruction has a target operand designation function, and stores in a general register designated as the target the bit string shifted out from said second buffer register when executing said first shift instruction.

6. A data processing device having a variable length code processing mechanism as recited in claim 2, further comprising:

means for calculating the shift amount by said second buffer register;

means for inputting the value of the necessary number of bits of the unlinked end of the second buffer register; and means for determining the shift amount without said first shift instruction providing the shift amount as an operand.

7. A data processing device having a variable length code processing mechanism as recited in claim 2, further comprising:

means for detecting and notifying the fact that the address register value exceeds a separately stipulated range when said conditional load instruction increments said address register value.

8. A data processing device having a variable length code processing mechanism, comprising:

an address register to store access addresses in memory;

a first buffer register that has a bit width at least equal to a load data width from said memory to store data loaded from said memory;

a second buffer register, which is linked to said first buffer register, and to which the contents of said first buffer register are shifted and stored;

a first offset register for storing a length of an empty region produced in a linked region which is configured by linking said first buffer register and said second buffer register when the data is packed and stored into an unlinked end of said second buffer register;

a first shift instruction, that designates a shift amount as an operand, to shift the data existing in said linked region to the unlinked end of said second buffer register by the shift amount, and simultaneously increments said first offset register value by the shift amount;

a conditional load instruction to load the data held in memory, addressed by the value of said address register, in said first buffer register, and simultaneously increments the value of said address register by a specified amount when the value of said first offset register is equal to or greater than the value of the bit width of said first buffer register, and wherein said conditional load instruction does nothing when the value of said first offset register is less than the bit width of said first buffer register;

a second shift instruction to shift the contents of said first buffer register, which said conditional load instruction has loaded from memory, to said second buffer register by a number of bits equal to the contents of the first offset register minus the first buffer register bit width, substitutes a bit portion of the linked end of said second buffer register, which is equal to the contents of the first offset register minus a first buffer register bit width, with the bits shifted out from said first buffer register, and simultaneously decrements the value of said first offset register by a number of said buffer register bits when the value of said first offset register is equal to or greater than the value of the bit width of said first buffer register, wherein said second shift instruction does nothing if the value of said first offset register is less than the bit width of said first buffer register;

a second offset register to set the difference between the shift amount specified as the operand of said first shift instruction and the bit width of said first buffer register;

a flag register that is set when said first shift instruction designates the shift amount that exceeds the bit width of said first register;

said first shift instruction further comprises:

a function to shift the linked region of said first and second buffer registers to the unlinked end of said second buffer register by a value of said second offset register, and simultaneously increments the value of said first offset register by the shift amount and to set said second offset register and flag register to 0 when the value of said second offset register does not exceed the bit width of said first buffer register; wherein said function shifts the linked region of said first and second buffer registers to the unlinked end of said second buffer register by the bit width portion of said first buffer register, and simultaneously increments the value of said first offset register by the number of bits of said first buffer register and reduces the value of said second offset register by the number of bits of said first buffer register when the value of said second offset register does exceed the bit width of said first buffer register; and said first shift instruction, said conditioned load instruction, and said second shift instruction are executed, and then the fact that the value of said flag register is 1 causes repeated execution of a instruction sequence comprising said third shift instruction, said conditional load instruction and said second shift instruction, until said flag register value becomes 0 when said first shift instruction designates an shift amount that exceeds the bit width of said first buffer register.

9. A data processing device having a variable length code processing mechanism as recited in claim 8, wherein:

said address register is no custom register provided; and a general register, which can be designated as an operand of said conditional load instruction, is used as said memory access address register.

10. A data processing device having a variable length code processing mechanism as recited in claim 8, wherein:

said first shift instruction has a target operand designation function, and stores in a general register designated as the target the bit string shifted out from said second buffer register when executing said first shift instruction.

11. A data processing device having a variable length code processing mechanism as recited in claim 8, further comprising:

means for calculating the shift amount by said second buffer register;

means for inputting the value of the necessary number of bits of the unlinked end; and means for determining the shift amount without said first shift instruction providing the shift amount as an operand.

12. A data processing device having a variable length code processing mechanism as recited in claim 8, further comprising:

means for detecting and notifying the fact that the address register value exceeds a separately stipulated range when said conditional load instruction increments said address register value.

13. A data processing device having a variable length code processing mechanism, comprising:

an address register to store access addresses in memory;

a first buffer register that has a bit width equal to a width of data stored in said memory, and that stores the data to be stored in said memory;

a second buffer register, which is linked to said first buffer register, and the contents of which are shifted and stored to said first buffer register;

an offset register for storing a length of an empty region produced in a linked region which is configured by linking said first buffer register and said second buffer register when the data is packed and stored into an unlinked end of said first buffer register;

first processing means for setting variable length data in said second buffer register;

second processing means for shifting the contents of said second buffer register to the unlinked end of said first buffer register by a shift amount equal to the contents of the offset register minus the second buffer register bit width, and for substituting a bit portion of the linked end of said first buffer register, which is equal to the contents of the offset register minus the second buffer register bit width, with the bits shifted out from said second buffer register, and for simultaneously decreasing said offset register value by a code length of said variable length data;

third processing means for storing the data of said first buffer register into memory addressed by the value of said address register, and for simultaneously incrementing the value of said address register by a specified amount when the value of said offset register is equal to or less than the value of the bit width of said second buffer register, wherein said third processing means does nothing when the value of said offset register exceeds the bit width of said second buffer register; and fourth processing means for copying the contents of said second buffer register to said first buffer register, and for simultaneously incrementing the value of said offset register by a number of said second buffer register bit width when the value of said offset register is equal to or less than the value of the bit width of said second buffer register, wherein said fourth processing means does nothing when the value of said offset register does exceed the bit width of said second buffer register.

14. A data processing device having a variable length code processing mechanism comprising:

an address register to store access addresses in memory;

a first buffer register that has a bit width equal to a width of data stored in said memory, and that stores the data to be stored in said memory;

a second buffer register, which is linked to said first buffer register, and the contents of which are shifted and stored to said first buffer register;

an offset register for storing a length of an empty region produced in a linked region which is configured by linking said first buffer register and said second buffer register when the data is packed and stored into an unlinked end of said first buffer register;

a write instruction to set the data given as the operand to said second buffer register;

a shift instruction that designates a code length as an operand, that shifts the contents of said second buffer register to the unlinked side of said first buffer register by a number equal to the contents of the offset register minus the second buffer register bit width, that substitutes a bit portion of the linked end of said first buffer register, which is equal to the contents of the offset register minus the second buffer register bit width, with the bits shifted out from said second buffer register, and that simultaneously decreases said offset register value by the code length of said operand;

a conditional store instruction that stores the data of said first buffer register into memory addressed by the value of said address register, and simultaneously increments the value of said address register by a specified amount when the value of said offset register is equal to or less than the value of the bit width of said second buffer register, wherein said conditional store instruction does nothing if the value of said offset register exceeds the bit width of said second buffer register, a conditional copy instruction that copies the contents of said second buffer register to said first buffer register, and simultaneously increments the value of said offset register by a number of said second buffer register bit width when the value of said offset register is equal to or less than the value of the bit width of said second buffer register, wherein said conditional copy instruction does nothing if the value of said offset register does exceed the bit width of said second buffer register.

15. A data processing device having a variable length code processing mechanism as recited in claim 10, further comprising:

a second offset register to set the difference between a code length specified as the operand of the shift instruction and the bit width of said second buffer register;

a flag register that is set when a code length that exceeds the bit width of said second buffer register is designated by said shift instruction;

a second shift instruction that when the value of said second offset register does not exceed the bit width of said second buffer register, shifts the contents of the second buffer register to said first buffer register by a number of bits equal to the contents of the offset register minus the second buffer register bit width, replaces a bit portion of the linked end of said first buffer register, which is equal to the contents of the offset register minus the second buffer register bit width, with the bits shifted out from said second buffer register, and simultaneously reduces the value of said offset register by the value of said second offset register and also sets the values of said second offset register and flag register to 0, wherein said second shift instruction, when the value of said second offset register does exceed the bit width of said second buffer register, shifts the contents of said second buffer register to said first buffer register by a bit number equal to the contents of the offset register minus the second buffer register bit width, replaces a bit portion of the linked end of said first buffer register, which is equal to the contents of the offset register minus the second buffer register bit width, with the bits shifted out from said second buffer register, and simultaneously reduces the values of said offset register and second offset register by the number of bits of said second buffer register; and when said shift instruction designates a code length that exceeds the bit width of said second buffer register, said shift instruction, said conditional store instruction, and said conditional copy instruction are executed, and then the fact that the value of said flag register is 1 causes the processing flow to branch into a instruction sequence comprising of said second shift instruction, said conditional store instruction and said conditional copy instruction, and said instruction sequence is repeated until said flag register value becomes 0.

16. A data processing device having a variable length code processing mechanism as recited in claim 14 wherein:

said address register is no custom register provided; and a general register, which can be designated as an operand of said conditional load instruction, is used as said memory access address register.

17. A data processing device having a variable length code processing mechanism as recited in claim 14, wherein:

said write instruction sets the data targeted for processing to the unlinked end of said second buffer register, and takes the shift amount based on said shift instruction to be the contents of the offset register minus the length of the data targeted for processing.

18. A data processing device having a variable length code processing mechanism as recited in claim 14, further comprising:

an instruction that combines said conditional store instruction function and said conditional copy instruction function.

19. A data processing device having a variable length code processing mechanism as recited in claim 14, further comprising:

means for calculating the shift amount by inputting the value of the necessary number of bits of the unlinked end of said second buffer register, wherein a hardware circuit means determines the shift amount without said first shift instruction providing the shift amount as an operand.

20. A data processing device having a variable length code processing mechanism as recited in claim 14, further comprising:

means for detecting and notifying a fact that the address register value exceeds a separately stipulated range when said conditional store instruction increments said address register value.

21. A data processing device having a variable length code processing mechanism, comprising:

an address register to store access addresses in memory;

a first buffer register that has a bit width equal to a width of data stored in said memory, and that stores the data to be stored in said memory;

a second buffer register, which is linked to said first buffer register, and the contents of which are shifted and stored to said first buffer register;

an offset register for storing a length of an empty region produced in a linked region which is configured by linking said first buffer register and said second buffer register when the data is packed and stored into an unlinked end of said first buffer register;

a write instruction to set the data given as an operand to said second buffer register;

a shift instruction that designates a code length as an operand, that shifts the contents of said second buffer register to an unlinked side of said first buffer register by a number of bits equal to the contents of the offset register minus the second buffer register bit width, that substitutes a bit portion of the linked end of said first buffer register, which is equal to the contents of the offset register minus the second buffer register bit width, with the bits shifted out from said second buffer register, and that simultaneously decreases said offset register value by a code length of said operand;

a conditional store instruction that stores the data of said first buffer register into memory addressed by the value of said address register, and simultaneously increments the value of said address register by a specified amount when the value of said offset register is equal to or less than the value of the bit width of said second buffer register, wherein said conditional store instruction does nothing when the value of said offset register exceeds the bit width of said second buffer register;

a conditional copy instruction that copies the contents of said second buffer register to said first buffer register, and simultaneously increments the value of said offset register by the number of said second buffer register bit width when the value of said offset register is equal to or less than the value of the bit width of said second buffer register, wherein said conditional copy instruction does nothing when the value of said offset register does exceed the bit width of said second buffer register;

a second offset register to set the difference between a code length specified as the operand of the shift instruction and the bit width of said second buffer register;

a flag register that is set when a code length that exceeds the bit width of said second buffer register is designated by said shift instruction;

wherein, when the value of said second offset register does not exceed the bit width of said second buffer register, said shift instruction shifts the contents of the second buffer register to said first buffer register by a number of bits equal to the contents of the offset register minus the second buffer register bit width, replaces a bit portion of the linked end of said first buffer register, which is equal to the contents of the offset register minus the second buffer register bit width, with the bits shifted out from said second buffer register, and simultaneously reduces the value of said offset register by the value of said offset register and also sets the values of said second offset register and flag register to 0;

when the value of said second offset register does exceed the bit width of said second buffer register, said shift instruction shifts the contents of said second buffer register to said first buffer register by a bit number equal to the contents of the offset register minus the second buffer register bit width, replaces the bit portion of the linked end of said first buffer register, which is equal to the contents of the offset register minus the second buffer register bit width, with the bits shifted out from said second buffer register, and simultaneously reduces the values of said offset register and second offset register by the number of bits of said second buffer register; and when said shift instruction designates a code length that exceeds the bit width of said second buffer register, said shift instruction, said conditional store instruction, and said conditional copy instruction are executed, and then the fact that the value of said flag register is 1 causes the processing flow to branch into a instruction sequence comprising of said shift instruction, said conditional store instruction and said conditional copy instruction, and said instruction sequence is repeated until said flag register value becomes 0.

22. A data processing device having a variable length code processing mechanism as recited in claim 21, wherein:

said address register is no custom register provided; and a general register, which can be designated as an operand of said conditional load instruction, is used as said memory access address register.

23. A data processing device having a variable length code processing mechanism as recited in claim 21, wherein:

said write instruction sets the data targeted for processing to the unlinked end of said second buffer register, and takes the shift amount based on said shift instruction to be the contents of the offset register minus the length of the data targeted for processing.

24. A data processing device having a variable length code processing mechanism as recited in claim 21, further comprising:

an instruction that combines said conditional store instruction function and said conditional copy instruction function.

25. A data processing device having a variable length code processing mechanism as recited in claim 21, further comprising:

means for calculating the shift amount by inputting the value of the necessary number of bits of the unlinked end of said second buffer register, wherein a hardware circuit means determines the shift amount without said first shift instruction providing the shift amount as an operand.

26. A data processing device having a variable length code processing mechanism as recited in claim 21, further comprising:

means for detecting and notifying a fact that the address register value exceeds a separately stipulated range when said conditional store instruction increments said address register value.

27. A data processing device having a variable length code processing mechanism, comprising:

an address register to store access addresses in a memory;

a first buffer register to store data loaded from said memory;

a second buffer register connected said first buffer register, and to which the contents of said first buffer register are shifted and stored;

an offset register for storing a length of an empty region produced in a linked region which is configured by linking said first buffer register and said second buffer register when the data is packed and stored into an unlinked end of said second buffer register;

first processing means for shifting the data in said second buffer register by a specified amount, and for simultaneously incrementing said offset register value by a shift amount;

second processing means for taking the offset register value of said address register to be the address and for simultaneously incrementing the value of said address register by a specified amount when the value of said offset register is equal to or greater than the value of a bit width of said first buffer register, and for loading the data held in memory, wherein said second processing means takes no action when the value of said offset register is less than the bit width of said first buffer register.

28. A data processing device having a variable length code processing mechanism, comprising:

an address register to store access addresses in memory;

a first buffer register to store data loaded from said memory;

a second buffer register, which is connected to said first buffer register, and to which the contents of said first buffer register is shifted and stored;

an offset register for storing a length of an empty region produced in a linked region which is configured by linking said first buffer register and said second buffer register when the data is packed and stored into an unlinked end of said second buffer register;

a first shift instruction that designates a shift amount as an operand, shifts the data existing in said linked region to the unlinked end of said second buffer register by the shift amount, and simultaneously increments said offset register value by the shift amount;

a conditional load instruction that loads the data held in memory, and simultaneously increments the value of said address register by a specified amount when the value of said offset register is equal to or greater than the value of a bit width of said first buffer register, wherein said conditional load instruction takes no action when the value of said offset register is less than the bit width of said first buffer register.

* * * * *